US008666046B2

(12) United States Patent
Ozeri et al.

(10) Patent No.: US 8,666,046 B2
(45) Date of Patent: Mar. 4, 2014

(54) SYSTEM AND METHOD FOR PROVIDING ENHANCED TELEPHONE CALL FUNCTIONS ASSOCIATED WITH CALLER AND/OR CALLEE INFORMATION DURING TELEPHONY RINGING SIGNAL

(75) Inventors: Saadia Ozeri, Rehovot (IL); Eliahou Orr, Rehovot (IL)

(73) Assignee: Logodial Ltd, Rehovot (IL)

( * ) Notice: Subject to any disclaimer, the term of this patent is extended or adjusted under 35 U.S.C. 154(b) by 81 days.

(21) Appl. No.: 13/091,197

(22) Filed: Apr. 21, 2011

(65) Prior Publication Data
US 2013/0034220 A1 Feb. 7, 2013

Related U.S. Application Data

(60) Provisional application No. 61/327,570, filed on Apr. 23, 2010, provisional application No. 61/431,519, filed on Jan. 11, 2011.

(51) Int. Cl.
*H04M 1/56* (2006.01)
(52) U.S. Cl.
USPC .................. 379/142.06; 379/207.15; 370/352
(58) Field of Classification Search
USPC ............... 379/88.19, 142.04, 142.06, 207.15; 370/352; 709/238
See application file for complete search history.

(56) References Cited

U.S. PATENT DOCUMENTS

| 5,633,909 | A | 5/1997 | Fitch |
| 5,708,422 | A | 1/1998 | Blonder et al. |
| 5,802,526 | A | 9/1998 | Fawcett et al. |
| 6,405,033 | B1 | 6/2002 | Kennedy, III et al. |
| 6,425,131 | B2 | 7/2002 | Crandall |
| 6,705,869 | B2 | 3/2004 | Schwartz |
| 6,807,259 | B1 * | 10/2004 | Patel et al. ............... 379/142.01 |
| 6,816,580 | B2 | 11/2004 | Timmins |
| 6,836,762 | B2 | 12/2004 | Speicher |
| 6,882,641 | B1 * | 4/2005 | Gallick et al. ............... 370/356 |
| 6,920,425 | B1 | 7/2005 | Will |
| 7,054,939 | B2 | 5/2006 | Koch |

(Continued)

FOREIGN PATENT DOCUMENTS

| EP | 0637160 | 2/1995 |
| EP | 0774853 | 5/1997 |

(Continued)

OTHER PUBLICATIONS

XP 000502390 IBM Technical Disclosure Bulletin, 19950201 International Business Machines Corp. (Thornwood), US; vol. 38, Nr:2, pp. 57-61; Feb. 1, 1995.

*Primary Examiner* — Creighton Smith
(74) *Attorney, Agent, or Firm* — Robert Schuler

(57) ABSTRACT

Method for providing caller information during a telephony ringing signal, including the procedures of storing caller information, associated with at least one of a caller and a callee, on a caller information server, installing a client application on a callee device, dialing a callee device CLI by the caller, identifying a caller device CLI by the callee device, contacting the caller information server by the callee device and providing the caller information server with at least one of the caller device CLI and the callee device CLI, retrieving, by the callee device, from the caller information server the caller information associated with at least one of the caller and the callee according to at least one of the caller device CLI and the callee device CLI, and presenting, on the callee device, the retrieved caller information.

24 Claims, 7 Drawing Sheets

(56) References Cited

U.S. PATENT DOCUMENTS

| | | |
|---|---|---|
| 7,142,661 B2 | 11/2006 | Erhart |
| 7,145,989 B1 | 12/2006 | Bond et al. |
| 7,174,163 B2 | 2/2007 | Aksu |
| 7,254,227 B2 | 8/2007 | Mumick |
| 7,272,222 B2 | 9/2007 | Joseph et al. |
| 7,280,528 B1 * | 10/2007 | Polit et al. .................... 370/352 |
| 7,342,917 B2 | 3/2008 | Mohan |
| 7,366,287 B2 | 4/2008 | Stroud et al. |
| 7,515,695 B1 | 4/2009 | Chan et al. |
| 7,716,055 B1 | 5/2010 | McIntosh et al. |
| 7,965,701 B1 * | 6/2011 | Toennis et al. ............... 370/352 |
| 8,000,454 B1 | 8/2011 | Or-Bach et al. |
| 8,054,952 B1 | 11/2011 | Or-Bach et al. |
| 2002/0001371 A1 | 1/2002 | Goldberg et al. |
| 2002/0059138 A1 | 5/2002 | Priest et al. |
| 2002/0147986 A1 | 10/2002 | Michael et al. |
| 2006/0034261 A1 | 2/2006 | Benveniste |
| 2006/0200569 A1 * | 9/2006 | Koch et al. .................... 709/227 |
| 2006/0251053 A1 | 11/2006 | Croak |
| 2007/0223662 A1 | 9/2007 | Jain et al. |
| 2007/0298776 A1 | 12/2007 | Arlene |
| 2008/0137642 A1 | 6/2008 | Teodosiu |
| 2008/0162628 A1 * | 7/2008 | Hill et al. ...................... 709/203 |
| 2009/0210536 A1 | 8/2009 | Allen |
| 2010/0172481 A1 | 7/2010 | Canu et al. |
| 2010/0257234 A1 * | 10/2010 | Caughey ....................... 709/203 |
| 2011/0060683 A1 | 3/2011 | Salmon Rock et al. |

FOREIGN PATENT DOCUMENTS

| | | |
|---|---|---|
| EP | 1701527 | 9/2006 |
| WO | WO96/24215 | 8/1996 |
| WO | WO00/44158 | 7/2000 |
| WO | WO2008/002705 | 1/2008 |

* cited by examiner

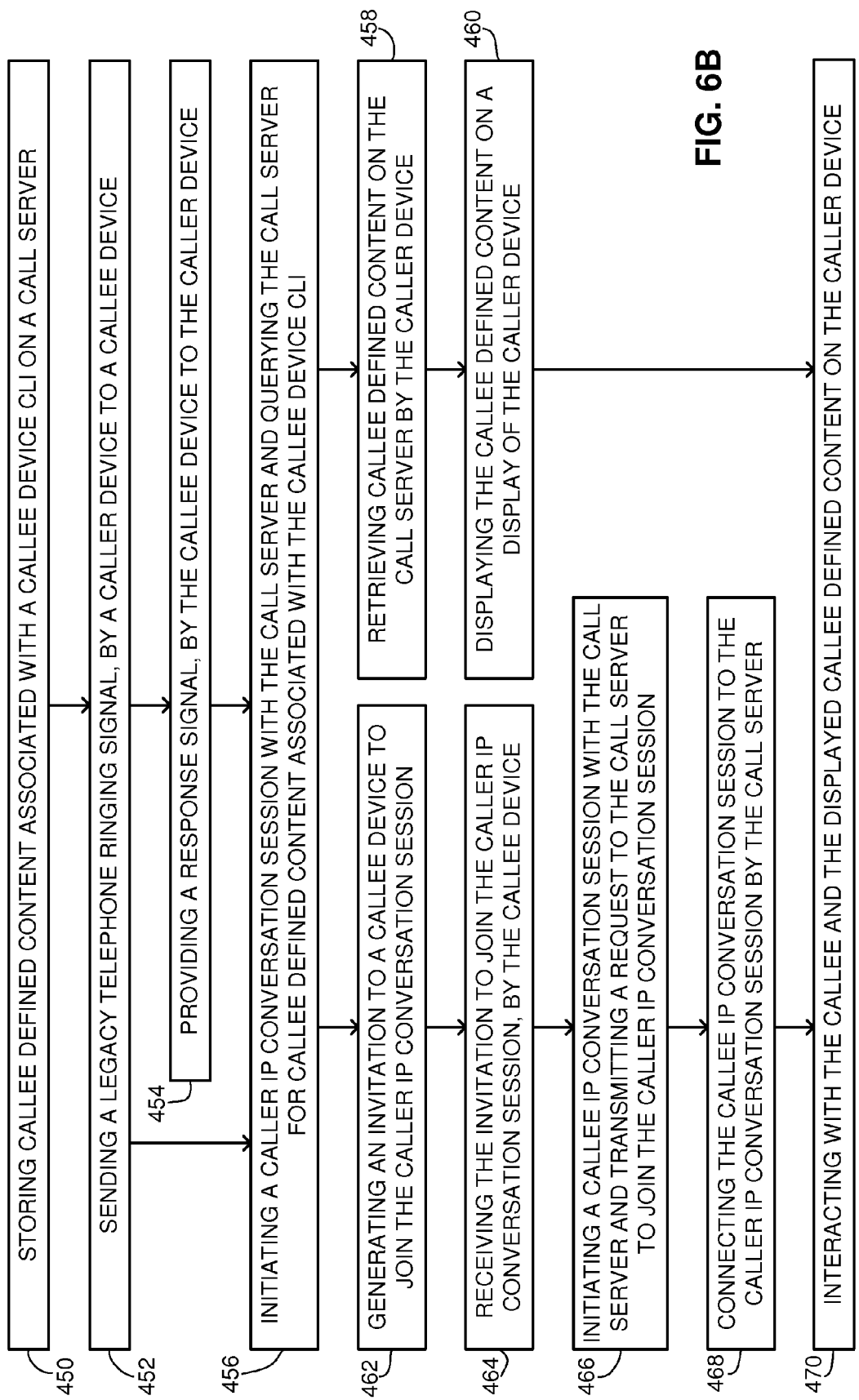

SYSTEM AND METHOD FOR PROVIDING ENHANCED TELEPHONE CALL FUNCTIONS ASSOCIATED WITH CALLER AND/OR CALLEE INFORMATION DURING TELEPHONY RINGING SIGNAL

CROSS-REFERENCE TO RELATED APPLICATIONS

This application claims the benefit of: provisional application Ser. No. 61/327,570, filed Apr. 23, 2010 titled "System and Method for Providing Caller Information During Telephony Ringing Signal"; and provisional application Ser. No. 61/431,519, filed Jan. 11, 2011 titled "System and Method for Providing Enhanced Telephone Call Functions Associated With Caller and/or Callee Information During Telephony Ringing Signal". Both applications are incorporated by reference as if reproduced in full below.

FIELD OF THE DISCLOSED TECHNIQUE

The disclosed technique relates to telephony and Internet Protocol (herein abbreviated IP) telephony, in general, and to methods and systems for providing enhanced telephone call functions between a caller device and a callee device, in particular.

BACKGROUND OF THE DISCLOSED TECHNIQUE

When a telephone call is initiated between a caller device and a callee device, a ringing signal is provided from the caller device to the callee device. During the ringing signal, based on a given telephony standard, recommendation or protocol, such as Signaling System No. 7 (SS7), SIP (Session Initiation Protocol), H.323, H.248, 3G-324M, CableLabs NCS (Network-Based Call Signaling Protocol), 3G/UMTS and 2G/GSM, the telephony standard, recommendation or protocol may provide for the callee device to identify the caller device only by the Caller Line Identification (CLI) of the caller device. Herein, the CLI is defined as the caller identification number in legacy telephony systems (for example, an E.164 number) or as the caller device address universal resource identifier (herein abbreviated URI) in IP-based communication systems (for example, as in SIP and H.323). It is known in the art of communication devices that the callee device may store the caller device CLI as well as additional identification information associated with the CLI, thereby providing specific telephone call functions. Examples of such communication devices include mobile phones, landline phones, IP phones, smartphones, video conferencing systems, IPTV set-top boxes and other devices that support one or more telephony standards. Examples of such specific telephone call functions include storing an image or a business card of the caller in the callee device as well as associations between the image or the business card and the caller device CLI.

The caller device CLI and the additional identification information may be stored on a network switching fabric (for example, a dedicated network database, a router or a softswitch) with which the callee device communicates with. When a caller device dials the callee device, a telephony switching fabric server uses the caller device CLI to retrieve information associated with the caller device from the network switching fabric. The retrieved information can be provided to the callee device using push technology, such as SMS, MMS and push-to-talk operator services. The information is then presented to the callee device.

U.S. Pat. No. 7,174,163 to Aksu et al., entitled "Method and Apparatus for Providing Images for Caller Identification Over a Mobile Network" is directed to a mobile network, which includes a Caller Line Picture Identification (PCLI) information subsystem connected to a Home Location Register (HLR), to a Visitor Location Register (VLR) and to a Short Message Service Center (SMSC). The PCLI sub-system include a PCLI manager and a PCLI database. The mobile station initiates a call. The call is passes to a first mobile switching center. The first mobile switching center queries the HLR or the VLR. The query and the response thereto is either passed through the PCLI manager or monitored by the PCLI manager. The PCLI manager determines if the caller is a subscriber of a PCLI service. Upon receiving validation, a first base station sends an ISDN setup message to the first mobile switching center, and the ISDN setup message is detected by the PCLI manager. If the caller is a PCLI subscriber, the PCLI manager instructs the first mobile switching center to hold or suspend the call.

While the call is suspended, the PCLI manager queries the PCLI database to map the CLI information for the mobile station user to the PCLI information (i.e., a picture of the caller) contained in the PCLI database of the user. The CLI information used in the mapping process is obtained from the first mobile switching station, which received the CLI information from the HLR or the VLR. The PCLI manager forwards the PCLI information to the SMSC. The SMSC uses the Short Message Service Transport Protocol (SMTP) to send the PCLI information to a second handset. The SMTP delivers the PCLI information to the handset using one single short message or multiple short messages depending on the amount of information to be sent. Enhanced Messaging Service (EMS) may also be used. The PCLI information is then stored in the memory of the second handset. Next, the PCLI manager instructs the first message service center to remove the hold or suspension on the call and continue with the call setup. Once the suspension is lifted, and the call setup is completed, the stored PCLI information in the second mobile handset is retrieved and displayed.

U.S. Pat. No. 7,342,917 to Mohan et al., entitled "Multimedia Personalized Call Management" is directed to methods and systems that assist either a calling party or a called party or both in managing a call based on multimedia data. The system of Mohan includes a multimedia personal call management (MPCM) subsystem. The MPCM subsystem is coupled with gateways, which include a mobile switch, a digital switch, and a soft switch. The MPCM subsystem includes a server. The MPCM subsystem further includes a database and a multimedia messaging service/short messaging service/WAP (Wireless Application Protocol) gateway.

In one embodiment, the MPCM subsystem requires the caller to subscribe to the service. In this embodiment a caller calls a number using a device (for example, a mobile handset). An authentication center authenticates the caller. If the caller is not a registered subscriber the authentication center routes the call to a switch. If the authentication center authenticates the caller, then a connection is established between the caller and the MPCM subsystem. The MPCM subsystem checks the profile of the caller. The MPCM subsystem then sends a menu of choices to the caller based on the subscribed service profile of the caller. The caller selects a media clip (for example, audio data, video data or non-medium specific data) to be transmitted to the called party. Furthermore, the MPCM subsystem checks the capability of the device of the called party. The MPCM subsystem converts the contents of the media clip to the necessary format based on the capability of the device of the called party. The MPCM subsystem provides the multimedia message to the called party.

Another example of a specific telephone call function includes connecting a public switched telephone network (herein abbreviated PSTN) caller device to an IP-based callee device using voice over IP technology (herein abbreviated VoIP). VoIP is not limited to just the transfer of voice signals over IP networks but can also include video calls, IP-based web conferences using video technology, webinars, data sharing and the like (i.e. IP conversational services). Collectively, these transfers of data can be referred to as IP conversation sessions, wherein data, such as voice data, video data or other types of data, is transferred from one party to another over an IP network, such as the Internet. In such a situation, the caller device may use a particular telephony protocol whereas the IP-based callee device may use another telephony protocol, such as an IP telephony protocol.

Systems and methods which enable such a telephone call function are known in the art. U.S. Patent Application Publication No. 2006/0034261 to Benveniste, entitled "Complementary VoIP service," is directed towards a method and system for enabling a voice call to be initiated on a PSTN and directed to a VoIP telephone on the Internet without the association of a unique telephone number to the VoIP telephone. A user who has a PSTN wireline telephone or a PSTN cell phone associates his or her VoIP telephone with the telephone number of the PSTN wireline telephone, the PSTN cell phone or with both numbers. When a call is placed to the user's PSTN wireline telephone, the PSTN first attempts to set up the call with the user's PSTN wireline telephone. When the user can answer his or her PSTN wireline telephone, the switching network establishes the call with the PSTN wireline telephone. However, if the user cannot answer his or her PSTN wireline telephone, the switching network forwards the call to a PSTN/VoIP gateway. The PSTN/VoIP gateway uses the telephone number of the user's PSTN wireline telephone to find the current IP address of the user's VoIP terminal. Once the PSTN/VoIP gateway has the current IP address of the VoIP telephone, the PSTN/VoIP gateway then attempts to establish the call with the VoIP telephone.

U.S. Patent Application Publication No. 2006/0251053 to Croak et al., entitled "Method and apparatus for routing calls to an alternative endpoint during network disruptions," is directed towards a method and apparatus for routing calls to an alternative endpoint during network disruptions in packet networks. According to the method, calls destined for a terminating point on a packet network, for example a VoIP network that is experiencing a service disruption, can be forwarded by the network to another endpoint. The method of Croak enables subscribers to register an alternative number, such as a cell phone number, a relative's phone number or a work number, that the network can use to forward calls to in the event of a service disruption. The provider can even use an alternative transport network, such as a PSTN, to forward these calls until the VoIP network service is restored.

U.S. Patent Application Publication No. 2008/0137642 to Teodosiu et al., entitled "Mobile device call to computing device," is directed towards a system and method for enabling a user to using a mobile device to call a contact and establish an VoIP call based on the contact. The contact is logged into a communication service through a computer application. According to the system of Teodosiu, a user selects a contact through a page displayed on a mobile device, where the contact may be an e-mail address, a messaging username or some other contact other than a phone number. Once selected, a call registration record with the contact data is generated at a network server. The mobile device then places a call to a VoIP system. The VoIP system receives the call, retrieves the call registration record and establishes an audio connection between the cell phone and the computer application through which the contact is logged into the communication service. The audio connection is a hybrid connection consisting of a mobile device voice connection between the caller's cell phone and a gateway system, and a VoIP connection between a computer and the gateway system.

U.S. Patent Application Publication No. 2009/0210536 to Allen et al., entitled "Methods and systems for facilitating transfer of sessions between user devices" is directed towards a method and system for transferring an active IP-based session from a first device to a second device associated with the same user. A network server is configured to enable the switching or swapping of an active session from one device to another device, where both devices are associated with a common user address. The switching or swapping is implemented with no or minimal effect on the active session or awareness of the remote party. The device switch may be performed in relation to any active IP-based session, including VoIP, video conferencing or other IP-based media sessions.

A further example of a specific telephone call function includes integrating a visual interactive voice response (herein abbreviated IVR) system with a telephone. Systems and methods performing such telephone call functions are known in the art. U.S. Pat. No. 6,920,425 to Will et al., entitled "Visual interactive response system and method translated from interactive voice response for telephone utility" is directed towards a system and method for translating a script for an interactive voice response system to a script for a visual interactive response system. The visual interactive response system executes the translated visual-based script when a caller calls the visual interactive response system using a display telephone. The visual interactive response system then transmits a visual menu to the display telephone to allow the caller to select a desired response. The selected response is subsequently sent back to the visual interactive response system for processing. The various scripts may be defined in appropriate markup languages. The translation system includes a parser for extracting command structures from the voice-based script, a visual-based structure generator for generating a corresponding command structure for the visual-based script and a text prompt combiner for incorporating text translated from voice prompts into the command structure generated by the structure generator. The translation system also includes an automatic speech recognition routine for automatically converting voice prompts into translated text and an editor for editing the visual-based script.

U.S. Pat. No. 7,054,939 to Koch et al., entitled "Simultaneous visual and telephonic access to interactive information delivery" is directed towards a system for enhancing a conventional interactive voice response (IVR) system by enabling the simultaneous delivery of visual information that corresponds to the voice-based information that is delivered over the telephone. A caller using the system of Koch contacts an IVR service provider by telephone and is provided with the option of a visual IVR (VIVR) session rather than just a conventional voice-only IVR session. The caller will only be provided the VIVR session option after it is determined that the caller has an existing Internet connection that will support a VIVR session. The determination can be made via a session ID database. The VIVR session provides visual information to the caller in the form of web pages delivered over an Internet connection and also provides audible message information over a conventional voice telephone connection. The caller may provide instructions to a VIVR server of the IVR service provider either over the telephone, for example by using voice commands or DTMF key code commands, or over a networking device attached to the Internet connection, for example by selecting a hyperlink. The VIVR server will respond to instructions received by either the telephone connection or the Internet connection and will modify the delivery of the voice-based and visual-based information accordingly.

U.S. Pat. No. 7,142,661 to Erhart et al., entitled "Method and apparatus for interactive voice processing with visual monitoring" is directed towards a system for providing a visual interface to an interactive voice response (IVR) system. The visual interface provides a visual interpretation of a running IVR application that allows an interaction between a caller and an IVR system to be monitored. Audio communication from a caller is processed in a conventional manner in accordance with an IVR script having a plurality of commands. A visual representation of the audio communication can then be presented to an agent on the side of the IVR system based on the IVR script. In one embodiment of the system of Erhart, the commands in an IVR script are mapped to a visual representation. As a caller speaks with the IVR system, one or more fields in the visual representation can be filled in with the utterances of the caller. Optionally, the agent can review or update a field in the visual representation that has been filled in with an utterance. This monitoring feature allows an agent to alter a flow of the IVR script or to intervene in the audio communication.

U.S. Pat. No. 6,425,131 to Crandall et al., entitled "Method and apparatus for internet co-browsing over cable television and controlled through computer telephony" is directed towards a system in which a sender can direct information, such as an audio-visual signal to a particular recipient's audio-visual display device, such as a cable television set. In this respect, information can be shared between the sender and the recipient. In one embodiment of the system of Crandall, a calling party originates a telephone call and associates the telephone call with audio-visual information that exists on the calling party's personal computer or on an Internet server. The called party answers the call and can tune an associated cable television to an appropriate channel in order to view the audio-visual information. The caller can modify the audio-visual information during the call. In an alternative embodiment of the system of Crandall, a called party, such as a representative at a customer service center or an interactive voice response unit, can associate audio-visual information with the call such that the calling party can see the data on the appropriate television channel.

U.S. Pat. No. 7,254,227 to Mumick et al., entitled "Signal-based session management for telephonic applications" is directed towards a system and method for a non-human (i.e., machine) party in a conversation carried over a voice circuit to respond to the fact that the voice circuit has been placed on hold. In a regular telephone network, placing a voice circuit on hold generates a signal. In the system of Mumick, the non-human party, such as an application, may receive the signal and take appropriate action. For example, if the application is in the middle of rendering a voice menu, it may pause the rendering until the voice circuit is no longer on hold. If the application is waiting for a user response with a pre-determined timeout, the timeout may be tolled during the time that the circuit is on hold. As another example, the application may switch to a non-voice mode of interaction with the user, for example by rendering a menu as data on the user's handset in a visual mode.

SUMMARY OF THE PRESENT DISCLOSED TECHNIQUE

It is an object of the disclosed technique to provide a novel method and system for enhanced telephone call functions. In accordance with the disclosed technique, there is thus provided a method for providing caller information during a telephony ringing signal. The method includes the procedures of storing caller information, associated with at least one of a caller and a callee, on a caller information server, installing a client application on a callee device and dialing a callee device CLI by the caller. The method also includes the procedures of identifying a caller device CLI by the callee device, contacting the caller information server by the callee device and providing the caller information server with at least one of the caller device CLI and the callee device CLI. The method further includes the procedures of retrieving, by the callee device, from the caller information server the caller information associated with at least one of the caller and the callee according to at least one of the caller device CLI and the callee device CLI, and presenting, on the callee device, the retrieved caller information.

In accordance with another aspect of the disclosed technique, there is thus provided a method for transferring a legacy telephone ringing signal to an IP-based session between a caller device and a callee device. The method includes the procedures of dialing a callee device CLI, by the caller device, using a legacy telephone ringing signal, initiating a caller IP conversation session with a call server, by the caller device, and providing caller information associated with a caller device CLI to the call server. The method also includes the procedures of generating an invitation to the callee device to join the caller IP conversation session, receiving the legacy telephone ringing signal by the callee device, thereby receiving the caller device CLI and providing the call server with at least the caller device CLI. The method further includes the procedures of receiving from the call server the caller information associated with the caller device CLI and the invitation to join the caller IP conversation session, initiating a callee IP conversation session with the call server and transmitting a request to the call server to join the caller IP conversation session. The method also includes the procedures of connecting the callee IP conversation session to the caller IP conversation session by the call server, and terminating the legacy telephone session once the callee IP conversation session is connected to the caller IP conversation session.

In accordance with a further aspect of the disclosed technique, there is thus provided a method for providing a callee defined content during a telephony ringing signal between a caller device and a callee device. The method includes the procedures of uploading and storing the callee defined content to a call server, the callee defined content being associated with a callee device CLI, transmitting a legacy telephone ringing signal, from the caller device to the callee device and the caller device initiating an IP-session with the call server. The method also includes the procedures of the caller device querying the call server for the callee defined content, the caller device retrieving the callee defined content from the call server, displaying the callee defined content on a display of the caller device, and the caller device interacting with the displayed callee defined content on the caller device.

In accordance with another aspect of the disclosed technique, there is thus provided a method for providing a callee defined content and a caller-callee interaction during a telephony ringing signal between a caller device and a callee device. The method includes the procedures of uploading and storing the callee defined content on a call server, the callee defined content being associated with a callee device CLI, transmitting a legacy telephone ringing signal from the caller device to the callee device and the caller device initiating a caller IP conversation session with the call server. The method also includes the procedures of the caller device querying the call server for the callee defined content, the caller device retrieving the callee defined content from the call server and displaying the callee defined content on a display of the caller device. The method further includes the procedures of generating an invitation to the callee device to join the caller IP conversation session, the callee device receiving the invitation to join the caller IP conversation session, the callee device initiating a callee IP conversation session with the call server and transmitting a request to the call server to join the caller IP conversation session. The method also includes the procedures of the call server connecting the callee IP conversation session to the caller IP conversation session, and a caller interacting with the displayed callee defined content on the caller device as well as with a callee.

BRIEF DESCRIPTION OF THE DRAWINGS

The disclosed technique will be understood and appreciated more fully from the following detailed description taken in conjunction with the drawings in which:

FIG. 6B is a schematic illustration of a method for providing callee defined content and caller-callee interaction during a telephony ringing signal, operative in accordance with a further embodiment of the disclosed technique.

DETAILED DESCRIPTION OF THE EMBODIMENTS

Figure 1:
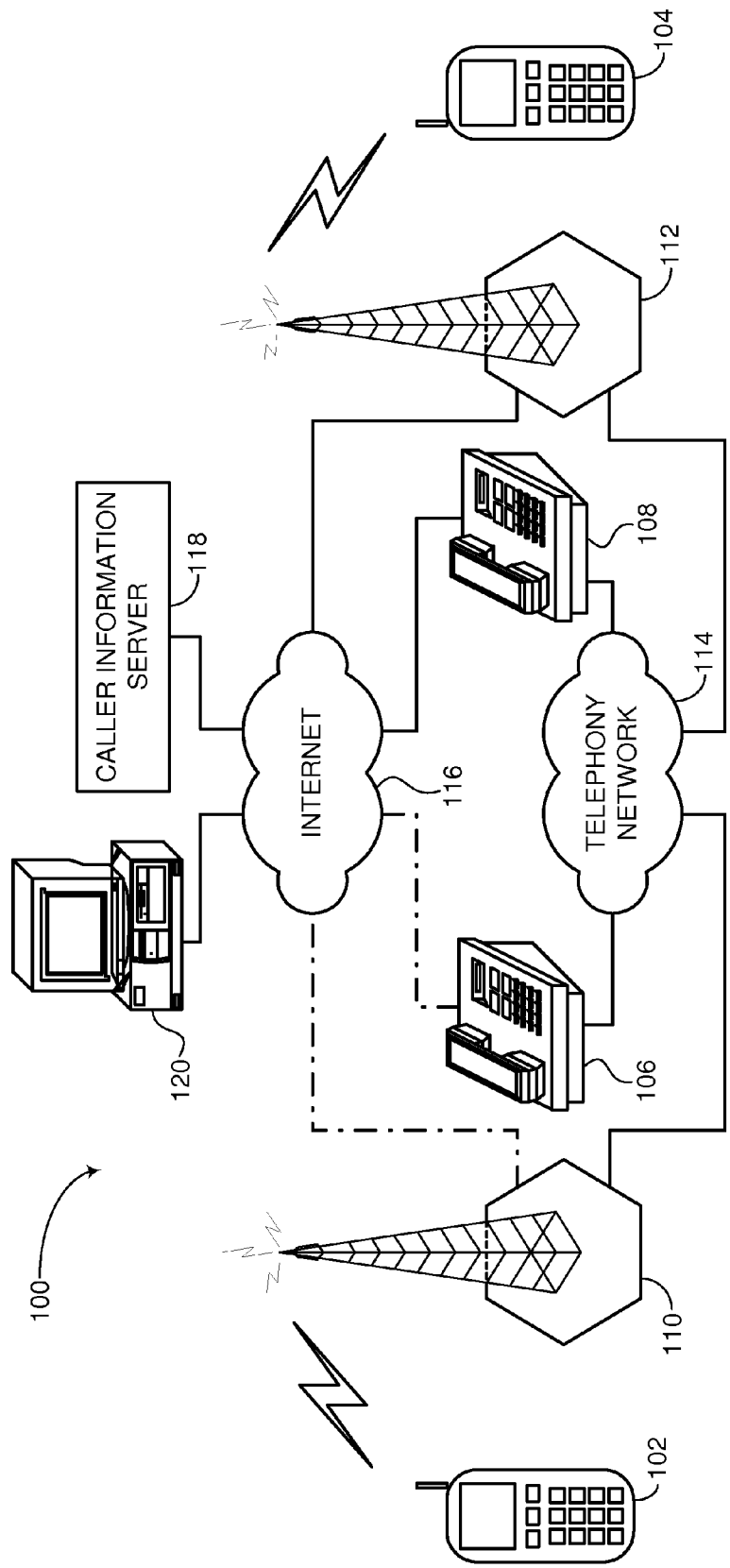
FIG. 1 is a schematic illustration of a system for providing caller information during a telephony ringing signal, constructed and operative in accordance with an embodiment of the disclosed technique.

The disclosed technique overcomes the disadvantages of the prior art by providing novel and enhanced telephone call functions. One such telephone call function is embodied as a caller information system and method in which the caller stores caller information on a caller information server connected to the internet. The caller information is associated at least with a caller device CLI. The caller information can also be associated with a specific callee device CLI. In addition selected parts of the caller information may be associated with selected callee device CLIs. The caller information can be modified by the caller either prior, during or after a call to a callee device via an Internet connection. When the caller device dials the callee device, the callee device receives and identifies the caller device CLI. The callee device (for example, a mobile phone, an IP phone, a video conferencing device, a landline phone or a personal digital assistance (PDA)) contacts, via the Internet, the caller information server on which the caller stored her respective caller information. The callee device then retrieves the caller information associated with the caller device CLI and the callee device CLI, as different caller information may be specified for different callee device CLIs. The callee device presents the retrieved caller information. The disclosed technique enables the callee device to receive the caller information without having any information associated with the caller CLI stored in the callee device or in a network storage coupled with the callee device prior to a ringing signal. In addition, according to the disclosed technique, the caller device and the callee device do not exchange information prior to a telephone call between the caller device and the callee device. Information related to the caller device and the callee device is stored on the caller information server, which both the caller device and the callee device can query for information about the other party. This is unlike prior art IP-based programs where a caller and a callee may be classified as 'friends' and where both parties have traded information there between during a previous telephone call.

Another telephone call function according to the disclosed technique is embodied as a system and method for seamlessly switching a legacy telephone session call (such as a PSTN session call) between a caller device and a callee device, initiated by a legacy telephone ringing signal, to an IP-based session call between the caller device and the callee device. This telephone call function is applicable when both the caller device and the callee device are coupled simultaneously to a legacy telephone system and to the Internet via an IP interface, for example when both devices are smartphones. When the caller device makes a call, via a legacy ringing signal, to the callee device via the PSTN or another legacy telephony system, the caller device simultaneously initiates an IP conversation session with a call system. The IP conversation session remains in an idle state. When the callee device receives the legacy ringing signal, the callee device accesses the call system and provides it with the caller device CLI as well as the callee device CLI. The call system provides the callee device with information regarding the caller device, including an invitation to join the previously initiated IP conversation session between the caller device and the call system. The invitation substantially informs the callee device that it may join the previously initiated IP conversation session. The information provided to the callee device about the caller device may be specific for the callee device CLI. According to a selected decision on the callee device, the callee device may initiate its own IP conversation session with the call system and then send a request to the call system to join the two IP conversation sessions together. The call system can operate as an IP conversation session proxy server, such as a SIP proxy. Acting as an IP conversation session proxy, the call system connects the two IP conversation sessions seamlessly, for example via a blind transfer SIP protocol service. Either one of the caller device, the callee device or both then terminates the legacy telephone call. In one embodiment of this telephone call function, the caller device and the callee device can initiate a peer-to-peer IP conversation session when the devices are coupled to the Internet via an open network, such as via a Wi-Fi network. In other IP networks, network operators may block such a capability between caller and callee devices via their firewall policies. This telephone call function of the disclosed technique does not require any external devices and gateways to seamlessly switch a legacy telephone session call to an IP-based session call. In addition, no device CLIs need to be pre-registered with a server or service to enable the seamless switching. Furthermore, the seamless switching according to the disclosed technique is executed automatically between the caller device and the callee device. Also, the disclosed technique allows for a low cost, easy to implement method and system for switching between a legacy telephone session call to an IP-based session call. The disclosed technique is cost effective in that it does not require any switching fabric, new equipment or change of equipment to implement.

A further telephone call function according to the disclosed technique is embodied as a system and method for providing a caller with callee defined content and an enhanced visual interactive service. The callee defined content may be a visual representation of an interactive voice response (herein abbreviated IVR) menu and hierarchy, if a callee or a third party has defined such content. The callee defined content can also be interactive content defined by the callee such as a webpage, an operational data entry form the caller can fill in or a whole website. This telephone call function is applicable when at least the caller device is coupled simultaneously to a legacy telephone system and to the Internet via an IP interface. According to the disclosed technique, prior to a call, the callee or a third party stores information on a call system, such as a visual representation of an IVR menu or a URL of a website or webpage and associates the stored information with a CLI number of the callee or a communication device of the callee. When the caller calls the callee, the caller's communication device, which is assumed to also have an IP interface, contacts the call system and simultaneously begins an IP-session with the call system. The caller's device provides the call system with the CLI of the callee device, thereby querying the call system for information stored on the call system associated with the CLI of the callee device.

If the stored information is a visual IVR, then the visual IVR is presented on the caller's communication device. Depending on how the visual IVR was stored on the call system, the caller may select menu items in the visual IVR either by touch (such as on a touchscreen telephone) or by using the DTMF (dual-tone multi-frequency) signals of the keypad of the caller's communication device. If the information is a webpage or website, or a link to a webpage or website, then the webpage or website is displayed on the caller's communication device. The webpage or website may include an electronic form to fill out or items to be selected on the webpage or website. The caller can fill out the form or select the items by either touch or by using DTMF signals as mentioned above. This telephone function of the disclosed technique provides for independently defined callee defined content. For example, in the case of a pre-defined IVR, the disclosed technique provides for a visual IVR that is independent of the pre-defined IVR such that no change, modification or integration in the pre-defined IVR is necessary in order to enable the visualization of the IVR. The pre-defined IVR may therefore remain as is without modification. In addition, the disclosed technique provides for a visual IVR presented to a caller in which the caller can interact with the visual IVR or other callee defined content. In this respect, when the caller calls the callee CLI, the callee CLI is translated into a visual representation which may include a visual IVR, a webpage, a website and the like or any other information that can be transferred over the Internet. Also, the disclosed technique does not require an IP conversation session to PSTN gateway or additional hardware to be implemented and no additional operations are required from the caller to be provided with a visual IVR system.

Reference is now made to FIG. 1, which is a schematic illustration of a system, generally referenced 100, for providing caller information during a telephony ringing signal, constructed and operative in accordance with an embodiment of the disclosed technique. System 100 includes a caller mobile device 102, a callee mobile device 104, a caller landline telephone 106, a callee landline smart telephone 108, a first base station 110, a second base station 112, a caller information server 118 and a computer 120. Callee landline smart telephone 108 and callee mobile device 104 are devices which are capable of communicating via telephony and IP-telephony protocols (such as SS7, SIP, H.323, H.248, 3G-324M, CableLabs NCS, 2G/GSM and 3G/UMTS) and via data protocols (such as HTTP/IP). Caller mobile device 102 and caller landline telephone 106 are devices, which are capable of communicating with at least telephony protocols.

Caller mobile device 102 is wirelessly coupled with first base station 110. Callee mobile device 104 is wirelessly coupled with second base station 112. First base station 110 and second base station 112 are coupled there between via a telephony network 114. Caller landline telephone 106 and callee landline smart telephone 108 are coupled there between via telephony network 114. Second base station 112 and callee landline smart telephone 108, caller information server 118 and computer 120 are all coupled with the Internet 116. First base station 110 and caller landline telephone 106 may optionally be coupled with the Internet 116 as indicated by the dash-dotted lines.

Prior to initiating a call, and before a callee receives a telephony call ringing signal, a caller uploads and stores caller information on caller information server 118. This caller information may be information (i.e., either related to the caller or not) that the caller associates with a caller device CLI. This caller information may also be associated with specific callee device CLIs. For example, caller information may be an image (for example, a picture of the caller or any other image such as a company logo) or a URL reference. The caller information may also be a video or audio file (e.g., a video or audio message), a live audio or video stream (for example, provided by a standard real-time streaming protocol (herein abbreviated RTSP) reference) or text, such as a text message, to be presented to the callee. The caller information may also be, for example, a digital business card of the caller or commercial information such as a company logo, product advertisements and the like. The caller information may be callee device specific as mentioned above such that different caller information associated with a single caller device CLI is retrieved for different callee device CLIs. For example, the caller information for callee devices classified by the caller as belonging to friends and family of the caller may be associated with an image of the caller, whereas the caller information for callee devices not classified by the caller as belong to friends and family may be associated with a company logo or a text message. The caller may upload the caller information to caller information server 118 from computer 120. When caller mobile device 102 or caller landline telephone 106 are coupled with the Internet 116 and each include an Internet application such as a web browser, the caller may upload the caller information to caller information server 118 from caller mobile device 102 and caller landline telephone 106. In addition, the callee installs, prior to receiving the call, either on callee mobile device 104, on callee landline smart telephone 108, or on both a client application. This client application enables callee mobile device 104 and callee landline smart telephone 108 to contact caller information server 118 via the Internet 116, when either one of callee mobile device 104 and callee landline smart telephone 108 receives a telephony ringing signal. Also, this client application enables callee mobile device 104 and callee landline smart telephone 108 to retrieve information from caller information sever 118 according to the caller device CLI and callee device CLI, as further explained below, and to present the retrieved information on the callee device. The client application is either installed by the callee, by a telephony service operator (i.e., either a mobile or a landline service operator) or by the manufacturer of either callee mobile device 104 or callee landline smart telephone 108.

When the caller initiates, for example, a call from either caller mobile device 102 or caller landline telephone 106, to callee mobile device 104, the caller dials the callee device number. Telephony network 114 receives a signal from caller mobile device 102 or caller landline telephone 106 and then sends a telephony ringing signal and the caller device CLI to callee mobile device 104 or callee landline smart telephone 108, depending on which callee device number was dialed. When callee mobile device 104 receives the telephony ringing signal and the caller device CLI, callee mobile device 104 then establishes a connection with caller information server 118 via the Internet 116, using the URL (Uniform Resource Locator) of caller information server 118. Callee mobile device 104 provides caller information server 118 with at least the caller device CLI and then retrieves the caller information associated with the caller device CLI from caller information server 118. Callee mobile device 104 may also provide caller information server 118 additionally with the callee device CLI and may then retrieve the caller information associated with both the caller device CLI and the callee device CLI from caller information server 118. Callee mobile device 104 may further provide caller information server 118 with callee identification information (for example, callee device CLI, callee username, callee password and the like). Callee mobile device 104 presents thereon the retrieved caller information to the callee. For example, when the caller information is a visual caller information (for example, an image, a video file, a text message, a live video stream or a URL), callee mobile device 104 displays the retrieved caller information. When the caller information is audio caller information (for example, a song, a ringtone, a recording of the voice of caller or a live audio stream), the callee mobile device 104 plays the caller information. Generally, the information can be of any type that can be processed by the callee device and be presented to the callee.

Similar to what was described above the caller may store on caller information server 118, caller information associated with caller landline telephone 106. Also similar to what was described above, callee landline smart telephone 108 can retrieve the caller information associated with either caller mobile device 102 or caller landline telephone 106 when either one of them initiates a call thereto. It is noted that the caller may store different caller information associated with each callee device. Thus, the caller information may be associated with both the caller device CLI and the callee identification information. Accordingly, when callee mobile device 104 or callee landline smart telephone 108 contacts caller information server 118, callee mobile device 104 and callee landline smart telephone 108 provide caller information server 118 with both the caller device CLI and the callee identification information. Thus, callee mobile device 104 and callee landline smart telephone 108 retrieve the caller information associated specifically with the callee identification information. Furthermore, the caller information may be associated with the date and the time. Thus, callee mobile device 104 and callee landline smart telephone 108 may retrieve the caller information associated therewith and also associated with the date and time of the call.

Figure 2:
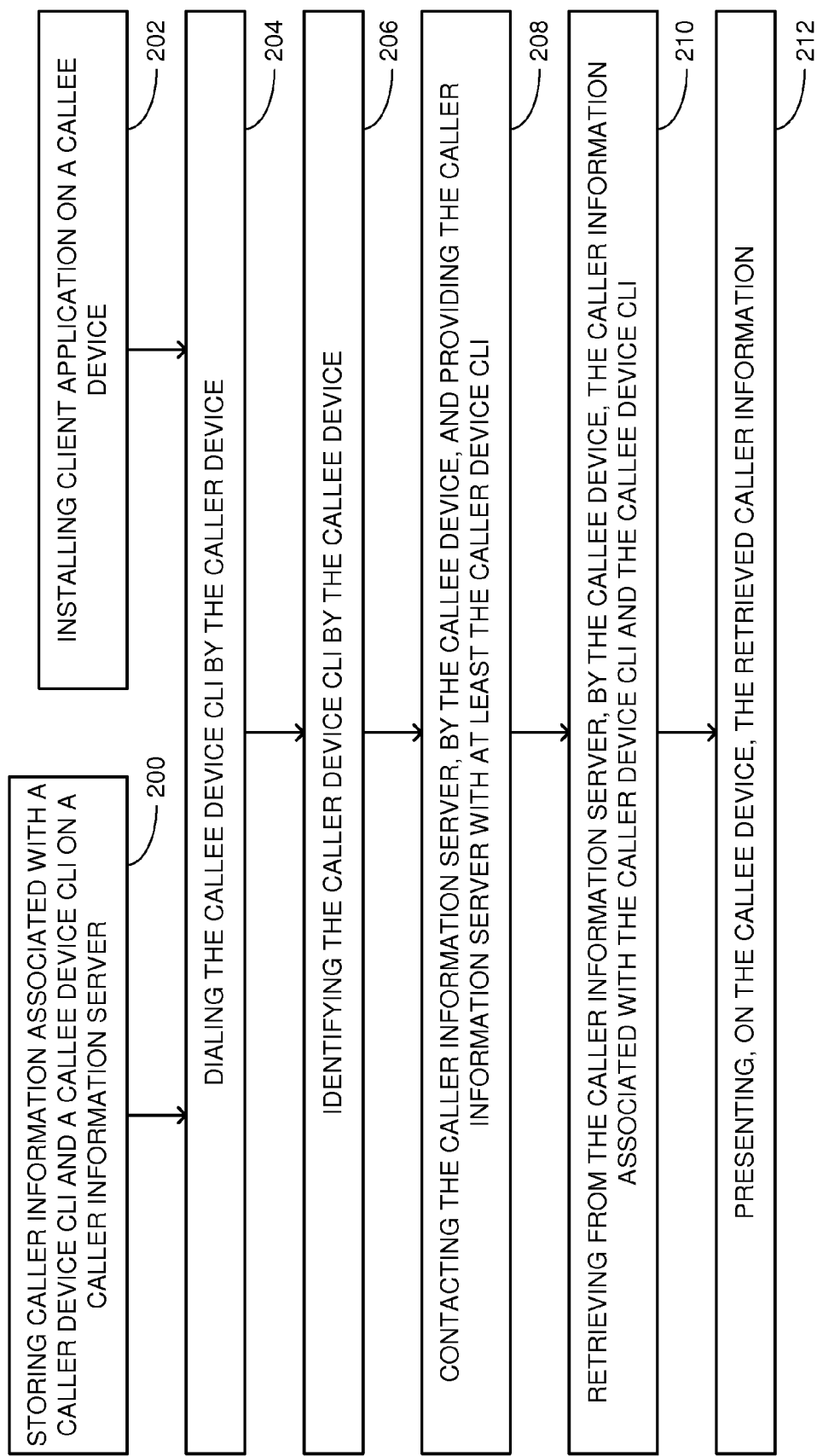
FIG. 2 is a schematic illustration of a method for providing caller information during a telephony ringing signal, operative in accordance with another embodiment of the disclosed technique.

Reference is now made to FIG. 2, which is a schematic illustration of a method for providing caller information during a telephony ringing signal, operative in accordance with another embodiment of the disclosed technique. In a procedure 200, caller information, associated with a caller device CLI and a callee device CLI is stored on a caller information server. In one embodiment of procedure 200 the caller information is only associated with the caller device CLI. In another embodiment of procedure 200, the caller information is associated with both the caller device CLI and the callee device CLI. This caller information may be of any type (i.e., either related to the caller or not) that the caller associates with a caller device CLI and optionally with a callee device CLI. As mentioned above, the caller information may be, for example, an image. The caller information may also be a video, an audio file, a live video or an audio stream (for example, providing a URI such as an RTSP reference) to be presented to the callee. The caller information may also be a digital business card of the caller or commercial data (for example, a company logo, a product advertisement, a URL of a company or a personal site). The caller information may optionally be associated with one or more callees. Furthermore, the caller information may be associated with the date and the time. The caller may upload the caller information to the caller information server either from a computer connected to the Internet or from the caller device (provided it is enabled with an IP interface), at any time prior to initiating a telephony ringing signal to the callee's communication device. With reference to FIG. 1, a caller uploads and stores caller information, to caller information server 118 (FIG. 1) from computer 120 (FIG. 1). The caller information may be associated with a caller device CLI as well as a callee device CLI. When caller mobile device 102 (FIG. 1) or caller landline telephone 106 (FIG. 1) are connected to the Internet and include an Internet application such as a web browser, the caller may upload and store caller information from caller mobile device 102 or from caller landline telephone 106.

In a procedure 202, a client application is installed on the callee device, prior to receiving a telephony ringing signal on the callee mobile device. This application enables the callee device, whether mobile or landline to contact the caller information server via the Internet and retrieve caller information from the caller information server. With reference to FIG. 1, a client application is installed on callee mobile device 104 (FIG. 1) or on callee landline smart telephone 108 (FIG. 1), prior to the telephony ringing signal on callee mobile device 104 or on callee landline smart telephone 108.

In procedure 204, the callee device CLI is dialed by the caller. With reference to FIG. 1, the caller dials the callee number from either caller mobile device 102 (FIG. 1) or caller landline telephone 106 (FIG. 1). In procedure 206, the caller device CLI is identified by the callee device. With reference to FIG. 1, callee mobile device 104 (FIG. 1) or callee landline smart telephone 108 (FIG. 1) identifies the caller device CLI. In procedure 208, the caller information server is contacted by the callee device and the callee device provides the caller information server at least with the caller device CLI. The callee device may further provide the caller information server with callee identification information, such as callee device CLI, callee username and/or password. The callee device stores the URL of the caller information server (for example during installation of the client application or as a predefined URL) and contacts the caller information server via the Internet. With reference to FIG. 1, callee mobile device 104 or callee landline smart telephone 108 contacts caller information server 118 (FIG. 1) via the Internet and provides caller information server 118 at least with the caller device CLI.

In procedure 210, the caller information, stored in the caller information server and associated with the caller device CLI and with the callee device CLI, is retrieved from the caller information server by the callee device. The caller information server provides the callee device with the caller information associated with the caller device CLI and the callee device. When the caller information is associated with a callee device CLI, the caller information server provides the callee device with the caller information associated with the caller device CLI and the callee device CLI. When the caller information is only associated with the caller device CLI, then caller information server provides the callee device with the caller information associated with the caller device CLI. When the caller information is associated with a date and a time, the caller information server provides the callee device with the caller information associated with the date and time of the call. With reference to FIG. 1, callee mobile device 104 (FIG. 1) or callee landline smart telephone 108 (FIG. 1) retrieves the caller information, associated with the caller, the callee or both, from caller information server 118 (FIG. 1) according to the caller device CLI and the callee device CLI.

In procedure 212, the retrieved caller information is presented on the callee device. For example, when the caller information is visual data (for example an image, a video file, a text message, a live stream or a URL), the callee device displays the visual data. When the information is audio data (for example, a song, a ringtone or a recording of the caller), the callee device plays the audio data. With reference to FIG. 1, callee mobile device 104 (FIG. 1) or callee landline smart telephone 108 (FIG. 1) presents the retrieved caller information on the callee device.

As mentioned above, the caller information may be a text, an audio message or a video message. Thus, the caller can send the callee a message by uploading the message to the caller information server, associating the message with the callee number and dialing the callee. Thus, the caller can send the callee messages and the callee can receive the message without picking up the call. Furthermore, the callee may receive the caller information without having any a priori information about the caller stored in the callee's communication device.

As mentioned above, a client application is installed on the callee communication device, for example, either on callee mobile device 104 (FIG. 1) or callee landline smart telephone 108 (FIG. 1) which enables the callee communication device to communicate with the caller information server, for example, caller information server 118 (FIG. 1). A state machine table, describing the operation of the client application is detailed in Table 1 below. In Table 1, the 'State' column lists the names of the different states, the 'Description' column describes the state and the 'Transition' column describes the condition at which a transition occurs and the next state is executed. It is noted that the term 'save' in Table 1 refers to temporarily saving the data in memory, for example RAM (Random Access Memory). The term 'stores' refers to saving the data in a long term memory such as a non-volatile ROM (for example, a Secure Digital (SD) card, a magnetic hard disk or a Multi Media Card (MMC)).

TABLE 1

State Machine Transition Table

| State | Description | Transition |
| --- | --- | --- |
| A | Awaiting ringing signal | When callee communication device receives a ringing signal: B; Else: A |
| B | Initiate client application | Client application is initiated: C |
| C | The client application verifies the operational mode thereof | When the client application mode is real time information mode: E; Else: D |
| D | Check for stored caller information associated with the caller device CLI in the callee communication device | When found: I; When not found: E |
| E | Contact caller information server | When successful: F; Else: A |
| F | Retrieve at least the caller device CLI from the callee mobile device memory | When successful: G; Else: A |
| G | Provide the retrieved caller device CLI and the callee device CLI to the caller information server | When successful: H; Else: A |
| H | Receive and temporarily save the caller and callee associated information on the callee communication device | When successful: I; Else A |
| I | Present part or all of the caller and callee associated information on the callee communication device | When completed: A |

Figure 3:
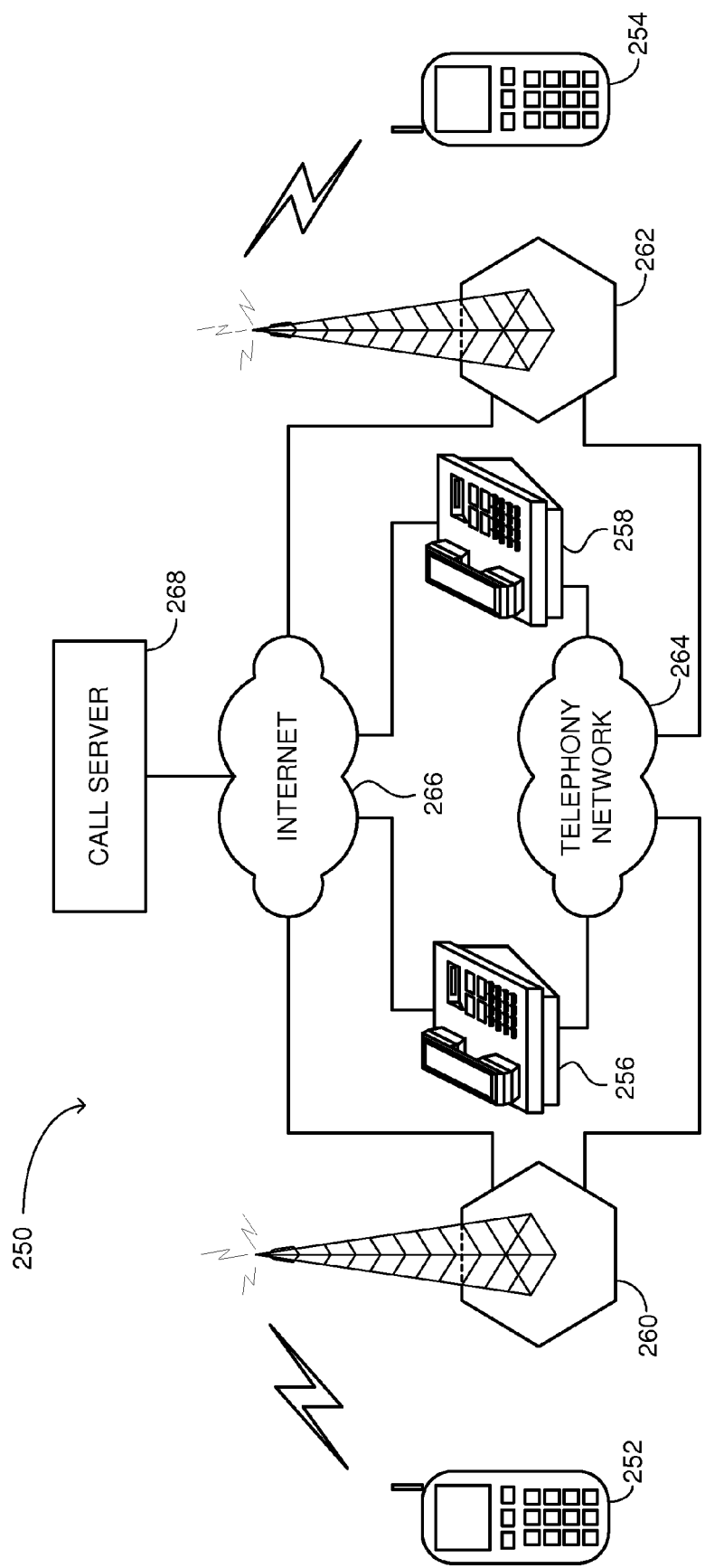
FIG. 3 is a schematic illustration of a system for switching a legacy telephone session into an IP conversation session, constructed and operative in accordance with a further embodiment of the disclosed technique.

Reference is now made to FIG. 3, which is a schematic illustration of a system for switching a legacy telephone session into an IP conversation session, generally referenced 250, constructed and operative in accordance with a further embodiment of the disclosed technique. System 250 includes a caller mobile device 252, a callee mobile device 254, a caller landline smart telephone 256, a callee landline smart telephone 258, a first base station 260, a second base station 262 and a call server 268. Caller landline smart telephone 256, callee landline smart telephone 258, caller mobile device 252 and callee mobile device 254 are devices which are capable of communicating via telephony and IP-telephony protocols as well as via data protocols. Caller mobile device 252 is wirelessly coupled with first base station 260. Callee mobile device 254 is wirelessly coupled with second base station 262. First base station 260 and second base station 262 are coupled there between via a telephony network 264 and via the Internet 266. Caller landline smart telephone 256 and callee landline smart telephone 258 are coupled there between via telephony network 264 and via the Internet 266. Call server 268 is coupled with the Internet 266. Call server 268 is substantially similar to caller information server 118 (FIG. 1) except that call server 268 can also function as a proxy between a caller device and a callee device. Call server 268 may include a proxy agent (not shown) or a proxy server (not shown) to enable proxy protocols found in, for example, SIP, H.323 and other standard or private IP conversation session protocols. Caller mobile device 252 and callee mobile device 254 are substantially similar to caller mobile device 102 (FIG. 1) and callee mobile device 104 (FIG. 1). First base station 260 and second base station 262 are substantially similar to first base station 110 (FIG. 1) and second base station 112 (FIG. 1). Caller landline smart telephone 256 is substantially similar to caller landline telephone 106 (FIG. 1) except that caller landline smart telephone 256 can also couple with the Internet 266 and can handle IP-based telephone sessions. Callee landline smart telephone 258 is substantially similar to callee landline smart telephone 108 (FIG. 1).

Figure 4:
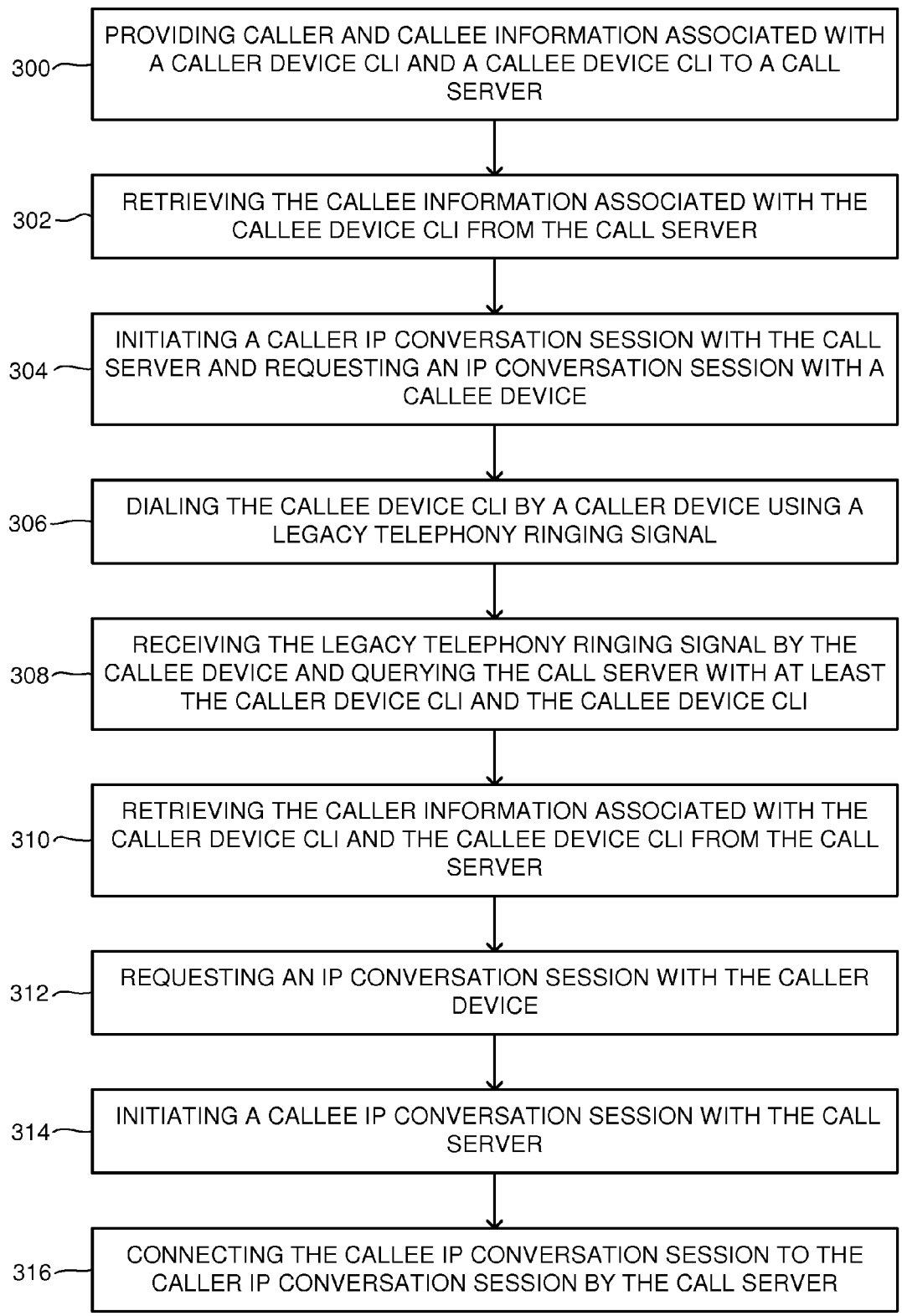
FIG. 4 is a schematic illustration of a method for switching a legacy telephony ringing signal or a legacy telephone session into an IP conversation session, operative in accordance with another embodiment of the disclosed technique.

As mentioned above, in the embodiment of FIG. 3, caller landline smart telephone 256, callee landline smart telephone 258, caller mobile device 252 and callee mobile device 254 are co-located devices which have legacy telephone interfaces, such as time-division multiplexing (herein abbreviated TDM) and circuit-switched (herein abbreviated CS) interfaces, as well as an IP interface. The disclosed technique describes switching between a legacy telephone call to an IP-based call seamlessly between at least a caller device and a callee device. Therefore caller landline smart telephone 256, callee landline smart telephone 258, caller mobile device 252 and callee mobile device 254 are brought merely as examples of caller devices and callee devices. According to the disclosed technique, at least one caller device and at least one callee device needs to be part of system 250. In FIGS. 3 and 4 reference is made to caller mobile device 252 and callee mobile device 254 as an example of a caller device and a callee device, where it is obvious that caller mobile device 252 can be replaced by caller landline smart telephone 256 and callee mobile device 254 can be replaced by callee landline smart telephone 258 as the caller device and callee device respectively. As is obvious, other combinations of caller devices and callee devices are possible and known to the worker skilled in the art.

The term 'legacy telephone interface' is used to describe telephone and cellular telephone interfaces which are CS-based for connecting a voice call between a caller device and a callee device via a PSTN or CS cellular network channels. The term 'legacy ringing signal' is used to describe the ringing signal sent from a caller device to a callee device over a telephony circuit-switched PSTN or a cellular network. The term 'legacy telephone session' is used to describe a call connection made between a caller device and a callee device via a PSTN or a cellular network. The terms 'IP conversation session' or 'IP-based session' or 'IP-based telephone session' are used to describe a call connection made between a caller device and a callee device via the Internet and includes VoIP sessions.

As mentioned above with reference to FIGS. 1 and 2, it is assumed that the caller device, such as caller mobile device 252, and the callee device, such as callee mobile device 254, each have a client application installed on them which enables each of the caller device and callee device to access and couple with call server 268 via the Internet 266. According to the disclosed technique, a caller device, such as caller mobile device 252, calls a callee device, such as callee mobile device 254, via telephony network 264 using, for example, an E.164 number associated with the callee device. Telephony network 264 may be a PSTN, a CS network, a TDM network and the like. The caller device provides the callee device with a legacy ringing signal. Simultaneously, as the caller device attempts to establish the call with the callee device, the caller device initiates a caller IP conversational session with call server 268 via the Internet 266, as described above in FIG. 1. In addition, the caller device provides call server 268 with information associated with the caller device and the callee device. For example, caller mobile device 252 may provide call server 268 with its user ID or with other address resolution information unique to caller mobile device 252 as well as the callee device CLI. Callee device information is provided by the caller device to call server 268 such that appropriate information associated with the caller device, which may be callee specific, is provided by call server 268 to the callee device. This information may be stored on call server 268. Call server 268 opens the caller IP conversation session with caller mobile device 252 and holds the initiated caller IP conversation session in an idle state. For example, call server 268 may establish a caller IP conversation session between caller mobile device 252 and a SIP proxy (not shown) in call server 268.

The callee device, such as callee mobile device 254, receives the legacy ringing signal from caller mobile device 252 and thereby establishes a legacy telephone session with caller mobile device 252. It is noted that the callee device, such as callee mobile device 254, may receive the caller device CLI without a legacy telephone session occurring, i.e., no pickup event occurs on the side of the callee device. Simultaneously, callee mobile device 254 establishes a connection with call server 268 via the Internet 266 and provides call server 268 with the caller device CLI. If callee mobile device 254 receives more information associated with the caller device from the legacy ringing signal, then callee mobile device 254 may provide this additional information associated with the caller device to call server 268. Once the caller device CLI is received by call server 268, call server 268 then provides any information associated with the caller device CLI to callee mobile device 254, as described above in FIGS. 1 and 2 (for example, see procedures 208 and 210 in FIG. 2).

Provided that both the caller device and the callee device are enabled with both legacy telephone and IP interfaces, and that an IP conversation session is established between the caller device and the proxy server or proxy agent in call server 268 prior to the callee device receiving the legacy ringing signal, system 250 continues to function as follows. Call server 268 provides information associated with the caller device CLI, which may be specific to callee mobile device 254, to callee mobile device 254. This information includes, for example, the caller device user ID or other address resolution information unique to caller mobile device 252 in call server 268, as well as a generated invitation to join the caller IP conversation session. The generated invitation may simply be a message to the callee device indicating that the caller device has established an IP conversation session with a proxy agent or server in call server 268. Callee mobile device 254 may accept the invitation automatically, or may present a user of callee mobile device 254 with a request to accept the invitation to join the caller IP conversation session. If the invitation is accepted, then callee mobile device 254 initiates its own IP conversational session with call server 268, for example with the proxy agent or server in call server 268, using information associated with the invitation to join the caller IP conversation session. As mentioned above, such information may include a user ID associated with the caller device.

Once the IP conversation session with the callee device is established, the proxy agent or server in call server 268 may connect the caller IP conversation session with the callee IP conversation session seamlessly. Known methods of connecting IP conversation session parties can be used by call server 268 to connect the caller IP conversation session with the callee IP conversation session. An example of such a known method includes using the SIP to execute a blind call transfer. Call server 268 can also send instructions to caller mobile device 252 and callee mobile device 254 to connect via a peer-to-peer IP conversation session if no obstacles are in place between the caller device and the callee device. Such obstacles may include firewalls or NAT (network addressing translation) obstacles or other known session controllers used by Internet operators for various reasons, such as security reasons. In the event that firewall or NAT obstacles are in place, which block the use of standard ports used in IP conversation sessions, call server 268 may instruct the caller device and the callee device to use other methods or protocols for establishing a peer-to-peer IP conversation session between the caller device and the callee device. For example, call server 268 may instruct the caller device and the callee device to connect via standard HTTP ports and to use such ports to multiplex and demultiplex the IP conversation session packets. According to this embodiment of the disclosed technique, an IP conversation session between a caller device and a callee device can be established even when Internet operators use known blocking schemes and techniques for preventing such services from operating over the Internet. Once the IP conversation session between the caller device and the callee device is established, the legacy telephone session is terminated between the caller device and the callee device. In the event that no pickup event occurred on the side of the callee device, then no legacy telephone session needs to be terminated. In this case, the legacy ringing signal is no longer provided by the caller device to the callee device. The legacy telephone session can be terminated by the caller device, the callee device or both. As shown by the disclosed technique, system 250 is cost effective as it doesn't require a switching fabric, new equipment or a change of equipment to function. System 250 can function automatically, as mentioned above and is easily implemented with known communication devices that have both legacy telephone and IP-based interfaces.

Reference is now made to FIG. 4, which is a schematic illustration of a method for switching a legacy telephony ringing signal or a legacy telephone session into an IP conversation session, operative in accordance with another embodiment of the disclosed technique. As mentioned above in FIG. 3, it is assumed that a caller device and a callee device, as referred to in the method of FIG. 4, each have a client application installed on them which enables each of the caller device and callee device to access and couple with a call server via the Internet. In addition, it is assumed that both the caller device and the callee device can connect via a legacy telephone session and an IP-based session. Also, as described below, the disclosed technique as shown in FIG. 4 can be executed without assuming that the callee device has IP conversation session capabilities.

In a procedure 300, caller and callee information associated with at least one of a caller device CLI and a callee device CLI are provided to a call server. The caller information may include images, audio messages and video messages which may be specific for particular callee device CLIs. The caller information may also include the various IP conversation session capabilities of the caller device, such as whether the caller device can handle a VoIP session, a video call over IP session, a web conference session and the like. The caller information can further include the callee device CLI that the caller wishes to call. The callee information can include information similar to the caller information. In particular, the callee information includes the various IP conversation capabilities of the callee device. In general, procedure 300 is executed before an attempt is made by the caller device to call the callee device. It is also noted that procedure 300 can be executed just before the caller device attempts to cal the callee device. With reference to FIG. 3, the caller device provides call server 268 (FIG. 3) with information associated with the caller device and the callee device. For example, caller mobile device 252 (FIG. 3) may provide call server 268 with its user ID or with other address resolution information unique to caller mobile device 252 as well as the callee device CLI. In a procedure 302, the caller device retrieves from the call server callee information associated with the callee device CLI. In particular, the caller device queries the call server to determine if the callee device has IP conversation session capabilities. If the callee device has IP conversation session capabilities, then the method of the FIG. 4 continues with procedure 304. If the callee device does not have IP conversation session capabilities, then the caller device may be informed of this via an audio or a visual message. In this case, the method of FIG. 4 continues with an alternate set of procedures (not shown) in which it is attempted to set up a legacy telephone session between the caller device and the callee device. Without IP conversation session capabilities in both the caller device and the callee device, an IP conversation session cannot be set up between the caller device and the callee device. With reference to FIG. 3, the caller device queries call server 268 (FIG. 3) for callee information.

In a procedure 304, the caller device initiates a caller IP conversation session with a call server. The caller device also provides the call server with a request for an IP conversation session with a callee device, as per the callee device CLI previously provided to the call server. It is noted that this request is optional in this procedure. The caller IP conversation session may be established between the caller device and a proxy agent or proxy server on the call server. With reference to FIG. 3, the caller device initiates a caller IP conversation session with call server 268 (FIG. 3) via the Internet 266 (FIG. 3). In addition, the caller device requests an IP conversation session with a callee device from call server 268.

In a procedure 306, the callee device CLI is dialed by a caller device using a legacy telephony ringing signal. The callee device CLI may be an E.164 number. With reference to FIG. 3, a caller device, such as caller mobile device 252 (FIG. 3), calls a callee device, such as callee mobile device 254 (FIG. 3), via telephony network 264 (FIG. 3) using, for example, an E.164 number associated with the callee device.

In a procedure 308, a callee device receives the legacy telephony ringing signal. Receiving the legacy telephony ringing signal by the callee device does not necessarily establish a pickup event between the caller device and the callee device. In one embodiment of the disclosed technique, the callee device executes a pickup event when it receives the legacy telephony ringing signal, thereby establishing a legacy telephone session with the caller device. In another embodiment of the disclosed technique, the callee device does not establish a pickup event between itself and the caller device when it receives the legacy telephony ringing signal. In either embodiment, by receiving the legacy telephony ringing signal, the callee device is provided with at least the caller device CLI. In this procedure, the callee device queries the call server with at least the caller device CLI and the callee device CLI. In general, in procedure 308, when the callee device receives an incoming ringing signal, the callee device queries the call server for information associated with the caller device CLI. In the embodiment where a legacy telephone session is established, if more information is transferred via the legacy telephone session to the callee device, then the callee device may transfer this additional information to the call server as well. With reference to FIG. 3, the callee device, such as callee mobile device 254 (FIG. 3), receives the legacy ringing signal from caller mobile device 252 (FIG. 3) and thereby receives at least the CLI of caller mobile device 252. Immediately afterwards, callee mobile device 254 establishes a connection with call server 268 (FIG. 3) via the Internet 266 (FIG. 3) and provides call server 268 with the caller device CLI as well as the callee device CLI.

In a procedure 310, once the call server receives the caller device CLI and the callee device CLI from the callee device, the call server provides any information associated with the caller device CLI and the callee device CLI to the callee device. With reference to FIG. 3, call server 268 (FIG. 3)

provides information associated with the caller device CLI and the callee device CLI to callee mobile device 254 (FIG. 3). This information includes, for example, the caller device user ID or other address resolution information unique to caller mobile device 252 (FIG. 3) in call server 268. In a procedure 312, the callee device provides the call server with a request for an IP conversation session with the caller device, based on the caller device CLI. It is noted that procedure 312 is an optional procedure and that after procedure 310 is executed, procedure 314 can be executed directly. With reference to FIG. 3, the callee device provides call server 268 (FIG. 3) with a request for an IP conversation session with the caller device. In a procedure 314, the callee device initiates a callee IP conversation session with the call server. As mentioned above, the callee IP conversation session may be established with a proxy agent or server on the call server. In the embodiment of FIG. 4 in procedure 308 in which a legacy telephone session was established, in procedure 314, when the callee IP conversation session is initiated, the legacy telephone session between the caller device and the callee device may be terminated using known methods. With reference to FIG. 3, callee mobile device 254 (FIG. 3) initiates its own IP conversation session with call server 268 (FIG. 3), for example with the proxy agent or server in call server 268.

In a procedure 316, the callee IP conversation session is connected to the caller IP conversation session by the call server. As described above, the connection can be made using various known protocols and techniques, such as the SIP to execute a blind call transfer, connecting the caller device to the callee device via a peer-to-peer IP conversation session or connecting the caller device to the callee device using standard HTTP ports. With reference to FIG. 3, once the IP conversation session with the callee device is established, the proxy agent or server in call server 268 (FIG. 3) may connect the caller IP conversation session with the callee IP conversation session seamlessly. Known methods of connecting IP conversation session parties can be used by call server 268 to connect the caller IP conversation session with the callee IP conversation session.

Figure 5:
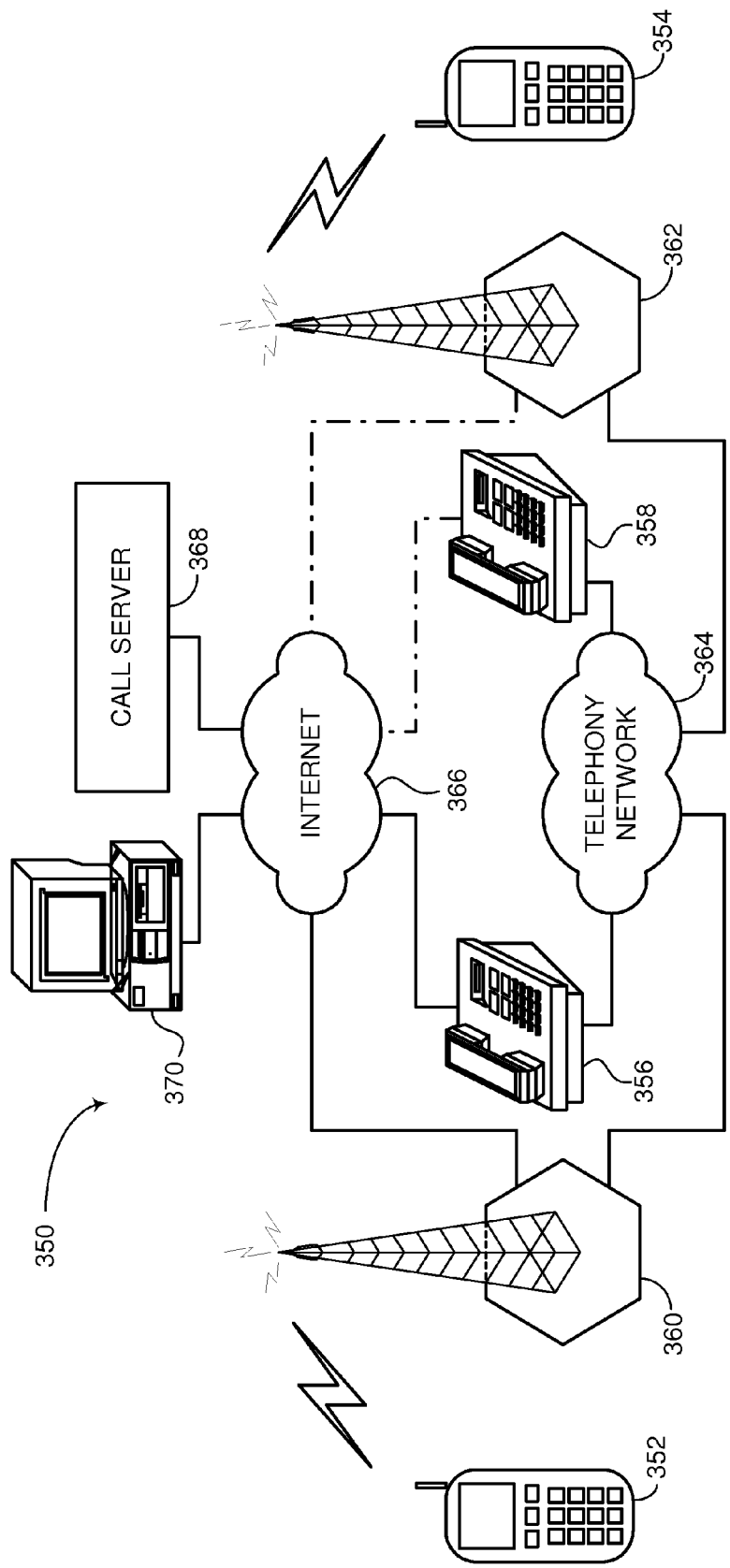
FIG. 5 is a schematic illustration of a system for providing callee defined content during a telephony ringing signal, constructed and operative in accordance with a further embodiment of the disclosed technique.

Reference is now made to FIG. 5, which is a schematic illustration of a system for providing callee defined content during a telephony ringing signal, generally referenced 350, constructed and operative in accordance with a further embodiment of the disclosed technique. System 350 includes a caller mobile device 352, a callee mobile device 354, a caller landline smart telephone 356, a callee landline telephone 358, a first base station 360, a second base station 362, a call server 368 and a computer 370. Caller landline smart telephone 356 and caller mobile device 352 are devices which are capable of communicating via telephony and IP-telephony protocols and via data protocols. Callee mobile device 354 and callee landline telephone 358 are devices which are capable of communicating with at least telephony protocols. Optionally, callee mobile device 354 and callee landline telephone 358 can be devices which are capable of also communicating via IP telephony protocols. Caller mobile device 352 is wirelessly coupled with first base station 360. Callee mobile device 354 is wirelessly coupled with second base station 362. First base station 360 and second base station 362 are coupled there between via a telephony network 364. Caller landline smart telephone 356 and callee landline telephone 358 are coupled there between via telephony network 364. First base station 360, caller landline smart telephone 356, call server 368 and computer 370 are all coupled with the Internet 366. Second base station 362 and callee landline telephone 358 are optionally coupled with the Internet 366, as indicated by the dash-dotted lines.

Call server 368 is substantially similar to caller information server 118 (FIG. 1). Caller mobile device 352 and callee mobile device 354 are substantially similar to caller mobile device 102 (FIG. 1) and callee mobile device 104 (FIG. 1). First base station 360 and second base station 362 are substantially similar to first base station 110 (FIG. 1) and second base station 112 (FIG. 1). Caller landline smart telephone 356 is substantially similar to caller landline telephone 106 (FIG. 1) except that caller landline smart telephone 356 can also couple with the Internet 366, can handle IP-based telephone sessions and has a display on which visual data can be presented. Caller landline smart telephone 356 and caller mobile device 352 are co-located devices having both legacy telephone interfaces as well as an IP interface. Callee landline telephone 358 is substantially similar to callee landline smart telephone 108 (FIG. 1), except that callee landline telephone 358 may not be able to handle IP-based telephone sessions. In this embodiment of the disclosed technique, callee mobile device 354 and callee landline telephone 358 may optionally be coupled with an IVR system (not shown). An interactive voice response (IVR) system is a system whereby information is presented to a caller via a pre-recorded voice and in which the caller can transmit information interactively back to the system using her voice, via DTMF keypad signals on a telephone keypad or both. IVR systems are common in many fields of business, for example to enable individuals to pay bills over the phone without speaking with a human operator or to route a telephone call to an appropriate extension in a large company.

In the embodiment described in FIG. 5, it is assumed that caller mobile device 352 and caller landline smart telephone 356 can both handle legacy telephone as well as IP-based telephone calls and that both caller mobile device 352 and caller landline smart telephone 356 have displays for displaying visual information. In addition, it is assumed that both caller mobile device 352 and caller landline smart telephone 356 are installed with a client application enabling them to access call server 368 via the Internet 366, for example, when they receive a legacy telephone ringing signal. This client application is similar to the client application mentioned in FIG. 1 above. Prior to initiating a call, and before a caller makes a phone call, a callee uploads and stores information on call server 368. This callee information can be referred to as callee defined content. The callee defined content may be information (i.e., either related to the callee or not) that the callee associates with a callee device CLI. The callee defined content can be, for example, a visual IVR menu, for example an HTML page with selectable options. The callee defined content can also be a visual interactive webpage including online forms which can feed data directly to the webpage, such as an ID number or a service code to receive information or services from the webpage. The callee defined content can also be a URL reference, a website, a webpage, an HTML form, a web application, a stream such as a live video feed or any other type of content which can be transferred over an IP network. The callee may upload the callee defined content to call server 368 from computer 370 or via an Internet connection if callee mobile device 354 or callee landline telephone 358 are coupled with the Internet 366.

In the following description, reference is made to caller landline smart telephone 356 and callee landline telephone 358 in particular. This particular reference is only brought as an example, where it is obvious to the worker skilled in the art that a caller may contact a callee via a mobile device as well, such as caller mobile device 352 and a callee may receive a phone call from a caller on a mobile device, such as callee mobile device 354. In one embodiment of the disclosed technique, when a caller initiates a call from caller landline smart telephone 356 to callee landline telephone 358, the caller dials the callee device number, which can be an E.164 number. Telephony network 364 receives a signal from caller landline smart telephone 356 and then sends a telephony ringing signal to callee landline telephone 358. Callee landline telephone 358 receives the telephony ringing signal and can extract from it the CLI of caller landline smart telephone 356. In the case that callee landline telephone 358 can connect to the Internet 366, upon receiving the telephony ringing signal and extracting the CLI of the caller, callee landline telephone 358 provides the CLI of caller landline smart telephone 356 as well as its own CLI to call server 368. Providing information to call server 368 does not necessitate establishing a legacy telephone call between caller landline smart telephone 356 and callee landline telephone 358. Call server 368 receives the information provided by callee landline telephone 358 and determines what information, if any, is to be provided to callee landline telephone 358, as described above. The information provided to callee landline telephone 358 may include an invitation from caller landline smart telephone 356 to join an IP conversation session. The user of callee landline telephone 358 may provide a signal to call server 368 to accept the invitation. In such a case, an IP conversation session is initiated between callee landline telephone 358 and call server 368. Call server 368 can then seamlessly couple the two IP conversation sessions together such that caller landline smart telephone 356 and callee landline telephone 358 are coupled via a single IP conversation session. In case a legacy telephone call, such as a TDM or a CS session was established between caller landline smart telephone 356 and callee landline telephone 358, the legacy telephone call is terminated by both parties when both parties are coupled via a single IP conversation session.

It is noted that when caller landline smart telephone 356 first initiated a call with callee landline telephone 358 it may also initiate an IP-based session with call server 368 and provide call server 368 with the callee device CLI, as described above in FIG. 1. Call server 368 receives the callee device CLI and determines whether there is any information stored in call server 368 associated with the callee device CLI to be provided to the caller device. In one embodiment, call server 368 may provide general or default information related to the callee device CLI as defined in a callee device CLI policy on call server 368. Both the caller and the callee may store default information on call server 368 to be provided to parties querying call server 368 when the CLIs of the querying parties are not listed in any user-defined lists of specific device CLIs. If information is stored on call server 368, then call server 368 provides the information to caller landline smart telephone 356. If the information is visual information, then the information is visually displayed on caller landline smart telephone 356. For example, callee landline telephone 358 may be coupled with a pre-defined IVR and the pre-defined IVR may have been stored visually in call server 368. Once a telephone session has been established between caller landline smart telephone 356 and callee landline telephone 358 (either a legacy telephone session or an IP conversation session), as the pre-defined IVR begins to talk to the caller, a visual version of the IVR may be presented to the caller on caller landline smart telephone 356. The visual IVR may include a visualization of the hierarchy of menus or items to select in the IVR. The caller can select menu items and navigate through the visual IVR presented to her via DTMF signals. The DTMF signals may be in-band signals such that the caller hears the signals as she depresses keys on the keypad of caller landline smart telephone 356 in response to the visual IVR. The DTMF signals are then provided to callee landline telephone 358, thereby selecting a particular option offered in the IVR or providing data to the IVR, such as a credit card number.

If the information is an electronic form to fill out or an item to select, the caller may fill out the form or select the item via touch selections (if caller landline smart telephone 356 is equipped with a touchscreen), via DTMF signals from the keypad of caller landline smart telephone 356 or via a computer mouse-like indicator button, such as in non-touch smartphones. If a response signal received from callee landline telephone 358 is a busy signal, then caller landline smart telephone 356 does not initiate an IP-based session with call server 368 and either waits for an answer signal from callee landline telephone 358 or terminates the call automatically.

According to another embodiment of the disclosed technique, even if the response signal is a busy signal, caller landline smart telephone 356 nevertheless initiates an IP-based session with call server 368. In this embodiment, caller landline smart telephone 356 provides call server 368 with the callee device CLI. Call server 368 then provides any information associated with the callee device CLI to caller landline smart telephone 356. The received information may be a web page of an IVR menu, a data entry form to feed in data to a website or any other type of content which can be transferred over the Internet 366. The IVR menu may be developed by a third party. In case a pickup event on the side of callee landline telephone 358 did not occur (i.e., a telephone session was not established between the caller and the callee), any IVR related menus on call server 368 may not be provided to caller landline smart telephone 356. At the same time though, other information such as content and forms for data feeding may be presented to caller landline smart telephone 356 as a replacement for an IVR menu. This may improve the interaction of the caller with the callee when the callee does not pick up. If the information presented is a webpage or website, then the caller can access the webpage or website via caller landline smart telephone 356 by using DTMF signals, for example out-of-band DTMF signals, via touch selections if caller landline smart telephone 356 is equipped with a touchscreen or via other computer mouse-like navigation options. If the information is an electronic form to be filled out, such as an HTML form, then the caller may fill out the form using DTMF signals of the keypad of caller landline smart telephone 356. In this case, a message may be left on call server 368 or provided by call server 368 to the callee that a caller device filled out an electronic form which is saved on call server 368 or on a website associated with the callee. The electronic form may be classified according to the caller device CLI.

The above two embodiments of the disclosed technique relate to scenarios where a callee has a pre-defined IVR. According to a further embodiment, as presented below, the disclosed technique relates to a situation where a callee does not have a pre-defined IVR but nevertheless has uploaded callee defined content to call server 368. In this embodiment, the callee defined content may be visual information such as a website, webpage, an electronic form and the like or any other type of information that can be transferred over an IP network, such as audio information. In this embodiment, caller landline smart telephone 356 may initiate an IP-based call to call server 368 simultaneously as a legacy telephone ringing signal is provided to callee landline telephone 358. Whether callee landline telephone 358 answers the call or provides caller landline smart telephone 356 with a busy signal, caller landline smart telephone 356 provides call server 368 with the callee device CLI and retrieves any information stored on call server 368 that is associated with the callee device CLI. As mentioned above, the information may be an HTML page, such as a webpage. The webpage may either include general information, an electronic form to fill out or both. In the case that associated information with the callee device CLI is an HTML page with a form to fill out, caller landline smart telephone 356 may be presented with an option for terminating the legacy telephone call with callee landline telephone 358 (i.e., whether a connection was made between the caller and the callee or whether a busy signal was sent to the caller from the callee). In this case, the caller may terminate the legacy telephone call while maintaining the IP-session with call server 368. The caller can then finish filling out the electronic form at their leisure. The filled out form can be provided to call server 368 which can then provide the electronic form to the callee. In addition, call server 368 can notify the callee that a filled out electronic form was saved for them on call server 368, for example, if callee landline telephone 358 is coupled with the Internet 366.

It is noted that the callee defined content described in FIG. 5 is independent of any information defined in or system coupled with callee landline telephone 358. For example, a pre-defined IVR system (not shown) coupled with callee landline telephone 358 and a visual IVR defined and uploaded to call server 368 are independent of one another. According to the disclosed technique, no change needs to be made to the pre-defined IVR system to enable the visual IVR. Also, given a phone system (such as system 350) provided with call server 368, no change or modification of equipment (such as a switching fabric or a PSTN to IP conversation session gateway) is required of the caller's communication devices (caller mobile device 352 and caller landline smart telephone 356) or the callee's communication devices (callee mobile device 354 and callee landline telephone 358) to enable system 350 of the disclosed technique.

According to another embodiment of the disclosed technique, system 350 of the disclosed technique can be generalized as a system for transferring information and data between a caller and a callee, as described above in FIG. 3. For example, using system 350 with call server 368 being substantially similar to call server 268 (FIG. 3), in the case that callee landline telephone 358 and callee mobile device 354 are coupled with the Internet 366. In such a case, callee landline telephone 358 may be a smart phone or may be a telephone in a call center with Internet access. In such a system, when a caller device, such as caller mobile device 352, calls a callee device, such as callee landline telephone 358, via a legacy telephone signal, the caller device simultaneously initiates an IP conversation session with call server 368. Similar to system 250 (FIG. 3), the caller device also generates an invitation to the callee device to join its IP conversation session. When the callee device receives the caller device CLI, the callee device initiates its own IP conversation session with call server 368 and provides call server 368 with the caller device CLI. The callee device may also establish a legacy telephone session with the caller device. Similar to what was described above in FIG. 3, the callee device receives the invitation from the caller device to join its IP conversation session. In this embodiment, call server 368 is similar to call server 268 and includes a proxy agent or proxy server (both not shown). The proxy agent or proxy server seamlessly couples the IP conversation session initiated by the caller device with the IP conversation session initiated by the callee device. In a further embodiment, when a legacy telephone session is established between the caller device and the callee device, the callee device may initiate an IP conversation session with the call server and provide an invitation to the caller device to join the IP conversation session while providing the call server the caller device CLI. In this embodiment, the caller device then initiates its own IP conversation session with the call server. After receiving the invitation to join the IP conversation session initiated by the callee device, the caller device may send a request to the call server to seamlessly connect the two IP conversation sessions together, as described above in FIGS. 3 and 4.

The caller device and the callee device are now coupled via an IP conversation session and also via a legacy telephone call session. In this respect, the callee or caller can interact and transfer data or information there between while maintaining the telephone conversation over the legacy telephone call session. For example, if the callee device is part of a call center and the callee is a call center service agent, the callee can send the caller visual information via the IP conversation session while talking to the caller via the legacy telephone call session. The callee can send an electronic form or other visual data and information over the IP conversation session to the caller device. The caller may be able to fill out the electronic form or navigate any visual information sent to the caller device via the IP conversation session. At the same time, the callee can monitor the actions of the caller via the IP conversation session, aid and assist the caller in filling out the electronic form or guide the caller through any visual information sent to the caller.

Figure 6A:
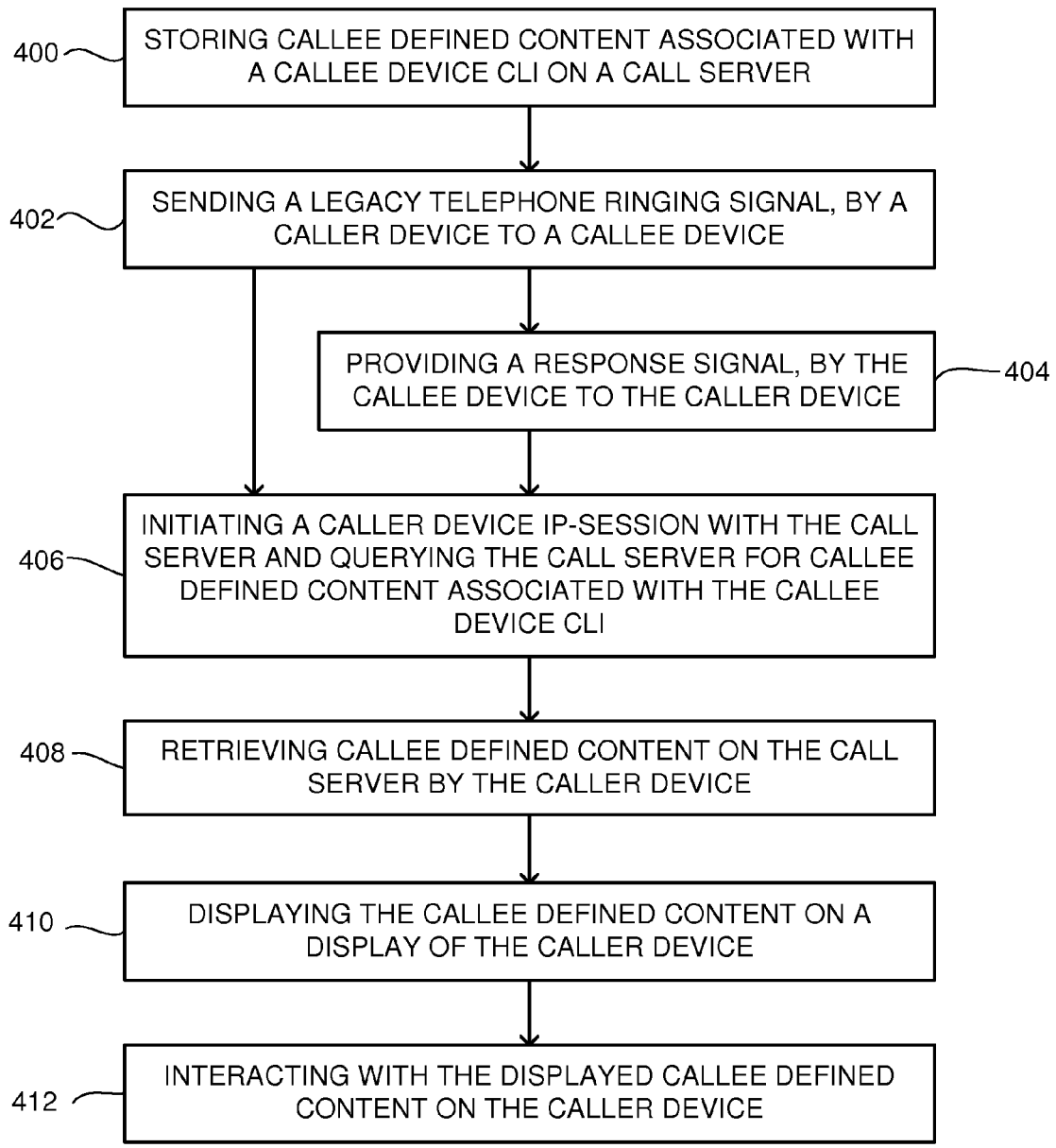
FIG. 6A is a schematic illustration of a method for providing callee defined content during a telephony ringing signal, operative in accordance with another embodiment of the disclosed technique.

Reference is now made to FIG. 6A, which is a schematic illustration of a method for providing callee defined content during a telephony ringing signal, operative in accordance with another embodiment of the disclosed technique. FIG. 6A is a method in which a caller device is assumed to be co-located, having a legacy telephone interface as well as an IP interface. In addition, the caller device is assumed to be able to access the Internet and has a display upon which graphics can be displayed. In a procedure 400, callee defined content associated with a callee device CLI is uploaded and stored on a call server. The callee defined content may be a visualization of an IVR system, such as a visual IVR graphically showing the hierarchy of menu items and items that can be selected via the IVR system. The callee defined content can also be an electronic form, such as an HTML form or any other type of information that can be transferred over an IP network. The callee defined content can also be interactive content such as a website, webpage or web application. The callee defined content is stored on the call server before a call from a caller is made to the callee. With reference to FIG. 5, prior to initiating a call, and before a caller makes a phone call, a callee uploads and stores information on call server 368 (FIG. 5). This callee information can be referred to as callee defined content. The callee defined content may be information (i.e., either related to the callee or not) that the callee associates with a callee device CLI. The callee defined content may also be information that the callee associates with a callee device CLI and a caller device CLI.

In a procedure 402, a caller device calls a callee device by sending a legacy telephone ringing signal. With reference to FIG. 5, when a caller initiates a call from caller landline smart telephone 356 (FIG. 5) to callee landline telephone 358 (FIG. 5), the caller dials the callee device number. Telephony network 364 (FIG. 5) receives a signal from caller landline smart telephone 356 and then sends a telephony ringing signal to callee landline telephone 358. In a procedure 404, the callee device provides a response signal to the caller device. The response signal may be an answer signal, in which case a legacy telephone session is established between the caller device and the callee device, or a busy signal. With reference to FIG. 5, callee landline telephone 358 (FIG. 5) answers the telephony ringing signal and provides caller landline smart telephone 356 (FIG. 5) with a response signal.

In a procedure 406, a caller device IP-session is initiated with the call server and the call server is queried by the caller device for callee defined content associated with the callee device CLI. In one embodiment of this procedure, the caller device IP-session is initiated irregardless of the type of response signal received in procedure 404. In an alternative to this procedure, the caller device IP-session is initiated only if the response signal received in procedure 404 is an answer signal. In this alternative embodiment, if the response signal received is a busy signal, then the caller device may delay its attempt to establish an IP-session with the call server until an answer signal is received from the callee device, or the caller device may terminate the call with the callee device. In a further alternative embodiment of the disclosed technique, after procedure 402 is executed procedure 406 is executed directly. In this further alternative, the caller device initiates an IP-session with the call server substantially simultaneously as it provides a legacy telephone ringing signal to the callee device, before the callee device has provided the caller device with a response signal. With reference to FIG. 5, caller landline smart telephone 356 (FIG. 5) may initiate an IP-based call to call server 368 (FIG. 5) simultaneously as a legacy telephony ringing signal is provided to callee landline telephone 358 (FIG. 5). Whether callee landline telephone 358 answers the call or provides caller landline smart telephone 356 with a busy signal, caller landline smart telephone 356 provides call server 368 with the callee device CLI and retrieves any information stored on call server 368 that is associated with the callee device CLI.

In a procedure 408, callee defined content on the call server is retrieved by the caller device, if such callee defined content is stored on the call server. Recall as mentioned above, the callee defined content may be an electronic form, a webpage, a website, a visual IVR or any other type of information that can be transferred via an IP network. With reference to FIG. 5, caller landline smart telephone 356 (FIG. 5) provides call server 368 (FIG. 5) with the callee device CLI and retrieves any information stored on call server 368 that is associated with the callee device CLI. In a procedure 410, the callee defined content is displayed on a display of the caller device. If the callee defined content is an electronic form, then the electronic form is displayed on the caller device. If the callee defined content is a website, webpage or a URL, then the website, webpage or data located at the URL is presented to the caller device. If the callee defined content is a visual IVR, then a visualization of an IVR system is presented to the caller on the caller device. In one embodiment of the disclosed technique, if the callee defined content is a visual IVR, then the visual IVR is only displayed on the caller device if the callee device provided the caller device with an answer signal. With reference to FIG. 5, call server 368 (FIG. 5) then provides any information associated with the callee device CLI to caller landline smart telephone 356 (FIG. 5).

In a procedure 412, the caller interacts with the displayed callee defined content on the caller device. If the callee defined content is an electronic form, then the caller can fill in the electronic form using the keypad of the caller device, such as via DTMF signals or via a QWERTY keypad. If the caller device has a touchscreen, then the caller may be able to fill out the form via touch selections. In this example, in an optional procedure (not shown), the caller device may terminate a legacy telephone session with the callee device, provided a legacy telephone session was established, while maintaining the IP-session with the call server. With the legacy telephone session terminated, in another optional procedure (not shown), the caller may then still fill out the electronic form and provide it to the call server where it is stored. In a further optional procedure (not shown), the call server can then notify the callee device of the electronic form filled out by the caller and stored on the call server.

If the callee defined content is a URL, website, webpage or web application, then the caller can interact with the data located at the URL, the website or webpage or with the web application using the caller device. If the callee defined content is a visual IVR, then the user may interact with the visual IVR, provided a legacy telephone session is established between the caller device and the callee device, by selecting menu items in the IVR system using DTMF keypad signals of the caller device. The DTMF keypad signals are then provided to the callee device via the legacy telephone session thereby selecting options in the IVR system. With reference to FIG. 5, the caller can select menu items and navigate through the visual IVR presented to her via DTMF signals. The DTMF signals may be in-band signals such that the caller hears the signals as she depresses keys on the keypad of caller landline smart telephone 356 (FIG. 5) in response to the visual IVR. The DTMF signals are then provided to callee landline telephone 358 (FIG. 5), thereby selecting a particular option offered in the IVR or providing data to the IVR. If the information is an electronic form to fill out or an item to select, the caller may fill out the form or select the item via touch selections or via DTMF signals from the keypad of caller landline smart telephone 356.

Reference is now made to FIG. 6B, which is a schematic illustration of a method for providing callee defined content and caller-callee interaction during a telephony ringing signal, operative in accordance with a further embodiment of the disclosed technique. FIG. 6B is a method in which a caller device and a callee device are assumed to be co-located, having a legacy telephone interface as well as an IP interface. In addition, the caller device and callee device are assumed to be able to access the Internet, with at least the caller device having a display upon which graphics can be displayed. In a procedure 450, callee defined content associated with a callee device CLI is uploaded and stored on a call server. The callee defined content may be a visualization of an IVR system, an electronic form or interactive content such as a website, webpage or web application. The callee defined content is stored on the call server before a call from a caller is made to the callee. With reference to FIG. 5, prior to initiating a call, and before a caller makes a phone call, a callee uploads and stores information on call server 368 (FIG. 5). This callee information can be referred to as callee defined content. The callee defined content may be information (i.e., either related to the callee or not) that the callee associates with a callee device CLI.

In a procedure 452, a caller device calls a callee device by sending a legacy telephone ringing signal. With reference to FIG. 5, when a caller initiates a call from caller landline smart telephone 356 (FIG. 5) to callee landline telephone 358 (FIG. 5), the caller dials the callee device number. In a procedure 454, the callee device provides a response signal to the caller device. The response signal may be an answer signal or a busy signal. With reference to FIG. 5, callee landline telephone 358 (FIG. 5) answers the telephony ringing signal and provides caller landline smart telephone 356 (FIG. 5) with a response signal.

In a procedure 456, a caller IP conversation session is initiated with the call server and the call server is queried by the caller device for callee defined content associated with the callee device CLI. In another embodiment of the disclosed technique, after procedure 452 is executed procedure 456 is executed directly. In this embodiment, the caller device initiates a caller IP conversation session with the call server substantially simultaneously as it provides a legacy telephone ringing signal to the callee device, before the callee device has provided the caller device with a response signal. It is noted that after procedure 456, the method proceeds simultaneously to procedures 458 and 462. With reference to FIG. 5, caller landline smart telephone 356 (FIG. 5) may initiate an IP-based call to call server 368 (FIG. 5) simultaneously as a legacy telephone ringing signal is provided to callee landline telephone 358 (FIG. 5). Whether callee landline telephone 358 answers the call or provides caller landline smart telephone 356 with a busy signal, caller landline smart telephone 356 provides call server 368 with the callee device CLI and retrieves any information stored on call server 368 that is associated with the callee device CLI.

In a procedure 458, callee defined content on the call server is retrieved by the caller device, if such callee defined content is stored on the call server. With reference to FIG. 5, caller landline smart telephone 356 (FIG. 5) provides call server 368 (FIG. 5) with the callee device CLI and retrieves any information stored on call server 368 that is associated with the callee device CLI. In a procedure 460, the callee defined content is displayed on a display of the caller device. With reference to FIG. 5, call server 368 (FIG. 5) then provides any information associated with the callee device CLI to caller landline smart telephone 356 (FIG. 5).

In a procedure 462, an invitation to a callee device to join the caller IP conversation session is generated. The invitation is generated once the caller IP conversation session is established between the caller device and the call server. With reference to FIG. 3, call server 268 (FIG. 3) generates an invitation to the callee device to join its IP conversation session. In a procedure 464, the callee device receives the invitation to join the caller IP conversation session generated in procedure 462 from the call server. The callee device, following the reception of the invitation, may respond based on a callee decision to accept the invitation. With reference to FIG. 3, call server 268 (FIG. 3) provides information associated with the caller device CLI to callee mobile device 254 (FIG. 3). This information includes, for example, the generated invitation to join the caller IP conversation session. In a procedure 466, the callee device initiates a callee IP conversation session with the call server and transmits a request to the call server to join the caller IP conversation session. The initiated callee IP conversation session may be initiated by the acceptance of the callee device of the invitation to join the caller IP conversation session. With reference to FIG. 3, if the invitation is accepted, then callee mobile device 254 (FIG. 3) initiates its own IP conversation session with call server 268 (FIG. 3), for example with the proxy agent or server in call server 268, using information associated with the invitation to join the caller IP conversation session.

In a procedure 468, the callee IP conversation session is connected to the caller IP conversation session by the call server. As described above, the connection can be made using various known protocols and techniques, such as the SIP to execute a blind call transfer, connecting the caller device to the callee device via a peer-to-peer IP conversation session or connecting the caller device to the callee device using standard HTTP ports. With reference to FIG. 3, once the IP conversation session with the callee device is established, the proxy agent or server in call server 268 (FIG. 3) may connect the caller IP conversation session with the callee IP conversation session seamlessly. In a procedure 470, the caller interacts with the displayed callee defined content on the caller device as well as with the callee. The caller can interact with the callee, and vice-versa, via the IP conversation session established between the caller device and the callee device in procedure 468. As described above, interaction between the caller and callee can include the callee monitoring the actions of the caller or assisting the caller in selecting or navigating a visual IVR or in filling out an electronic form. With reference to FIG. 5, the caller device and the callee device are now coupled via an IP conversation session and also via a legacy telephone call session. In this respect, the callee or caller can interact and transfer data or information there between while maintaining the telephone conversation over the legacy telephone call session. It is noted that procedures 462 to 468 can be executed simultaneously as procedure 458 and 460 are executed.

It will be appreciated by persons skilled in the art that the disclosed technique is not limited to what has been particularly shown and described hereinabove. Rather the scope of the disclosed technique is defined only by the claims, which follow.

The invention claimed is:

1. Method for providing caller information during a telephony ringing signal, comprising the procedures of:
    storing caller information, associated with at least one of a caller and a callee, on a caller information server;
    installing a client application on a callee device;
    initiating a telephone call by dialing a callee device CLI by said caller, the caller information server not receiving the telephone call;
    the callee device receiving the telephone call from the caller deviceand identifying a caller device CLI;
    initiating an IP session by said callee device client application in order to connect with said caller information server and providing said caller information server with at least one of said caller device CLI and said callee device CLI;
    retrieving, by said callee device, from said caller information server said caller information associated with at least one of said caller and said callee according to at least one of said caller device CLI and said callee device CLI; and
    presenting, on said callee device, said retrieved caller information during the telephony ringing signal.

2. The method according to claim 1, further comprising the procedure of providing said caller information server with callee identification information after said procedure of contacting said caller information server.

3. The method according to claim 1, wherein said callee device is a mobile device.

4. The method according to claim 1, wherein said callee device is a landline smart telephone.

5. The method according to claim 1, wherein said caller information is selected from the list consisting of:
    an image;
    a video file;
    an audio file;
    a text file;
    a video stream;
    an audio stream;
    video data;
    audio data; and
    a URL.

6. Method for transferring a legacy telephone ringing signal to an IP-based session between a caller device and a callee device, comprising the procedures of:
    initiating a legacy telephone session by dialing a callee device CLI, by said caller device, using a legacy telephone ringing signal;

initiating a caller IP conversation session with a call server, by said caller device, and providing caller information associated with a caller device CLI to said call server;

generating an invitation to said callee device to join said caller IP conversation session;

receiving said legacy telephone ringing signal by said callee device, thereby receiving said caller device CLI and providing said call server with at least said caller device CLI;

receiving from said call server said caller information associated with said caller device CLI and said invitation to join said caller IP conversation session;

initiating a callee IP conversation session with said call server and transmitting a request to said call server to join said caller IP conversation session;

connecting said callee IP conversation session to said caller IP conversation session by said call server; and terminating said legacy telephone session once said callee IP conversation session is connected to said caller IP conversation session.

7. The method according to claim 6, wherein said caller information associated with said caller device CLI is selected from the list consisting of:
   an image;
   a video file;
   an audio file;
   a text file;
   a video stream;
   an audio stream;
   video data;
   audio data; and
   a URL.

8. The method according to claim 6, wherein said caller device and said callee device are both co-located devices comprising at least one legacy telephone interface an internet protocol (IP) interface.

9. The method according to claim 6, wherein said call server functions as a proxy between said caller device and said callee device.

10. The method according to claim 6, wherein said procedure of receiving said legacy telephone ringing signal by said callee device comprises the sub-procedure of establishing a pickup event between said caller device and said callee device.

11. Method for providing a callee defined content during a telephony ringing signal between a caller device and a callee device, comprising the procedures of:
   uploading and storing said callee defined content to a call server, said callee defined content being associated with a callee device CLI;
   transmitting a legacy telephone ringing signal, from said caller device to said callee device;
   said caller device initiating an IP-session with said call server;
   said caller device querying said call server for said callee defined content;
   said caller device retrieving said callee defined content from said call server;
   displaying said callee defined content on a display of said caller device during the legacy telephone ringing signal; and
   said caller device interacting with said displayed callee defined content on said caller device.

12. The method according to claim 11, wherein said caller device is a mobile device.

13. The method according to claim 11, wherein said caller device is a landline smart telephone.

14. The method according to claim 11, wherein said callee device is coupled with an interactive voice response (IVR) system.

15. The method according to claim 11, wherein said callee defined content is selected from the list consisting of:
   a visual interactive voice response (IVR) menu;
   a visual interactive webpage;
   a URL;
   an HTML form;
   a web application;
   an audio stream; and
   a video stream.

16. The method according to claim 11, further comprising the procedure of said callee device providing a response signal to said caller device after said procedure of transmitting said legacy telephone ringing signal.

17. The method according to claim 16, wherein said response signal is a busy signal.

18. The method according to claim 16, wherein said response signal is an answer signal, thereby establishing a legacy telephone session between said caller device and said callee device.

19. The method according to claim 18, further comprising the procedures of:
   after said procedure of said callee device providing said response signal, said callee device initiating a callee IP conversation session with said call server;
   providing an invitation to said caller device to join said callee IP conversation session; and
   connecting said callee IP conversation session to said IP-session by said call server after said procedure of said caller device initiating said IP-session with said call server.

20. The method according to claim 19, further comprising the procedure of terminating said legacy telephone session once said callee IP conversation session is connected to said IP-session.

21. The method according to claim 11, wherein said caller device is a co-located device comprising at least one legacy telephone interface an internet protocol (IP) interface.

22. Method for providing a callee defined content and a caller-callee interaction during a telephony ringing signal between a caller device and a callee device, comprising the procedures of:
   uploading and storing said callee defined content on a call server, said callee defined content being associated with a callee device CLI;
   transmitting a legacy telephone ringing signal from said caller device to said callee device;
   said caller device initiating a caller IP conversation session with said call server;
   said caller device querying said call server for said callee defined content;
   said caller device retrieving said callee defined content from said call server;
   displaying said callee defined content on a display of said caller device;
   generating an invitation by said call server to said callee device to join said caller IP conversation session;
   said callee device receiving said invitation to join said caller IP conversation session;
   said callee device initiating a callee IP conversation session with said call server and transmitting a request to said call server to join said caller IP conversation session;
   said call server connecting said callee IP conversation session to said caller IP conversation session; and a caller interacting with said displayed callee defined content on said caller device as well as with a callee via the IP conversation session during said telephony ringing signal.

23. The method according to claim 22, wherein said caller device and said callee device are both co-located devices comprising at least one legacy telephone interface an internet protocol (IP) interface.

24. The method according to claim 22, further comprising the procedure of said callee device providing a response signal to said caller device after said procedure of transmitting said legacy telephone ringing signal.

* * * * *